US008100771B2

(12) United States Patent
Maeda et al.

(10) Patent No.: US 8,100,771 B2
(45) Date of Patent: Jan. 24, 2012

(54) GAME DEVICE, SERVER DEVICE, GAME PROCESS CONTROL METHOD, AND INFORMATION STORAGE MEDIUM

(75) Inventors: Kazuhiro Maeda, Tokyo (JP); Masaki Uchida, Tokyo (JP); Kei Kobayashi, Yokohama (JP)

(73) Assignee: NAMCO BANDAI Games Inc., Tokyo (JP)

( * ) Notice: Subject to any disclaimer, the term of this patent is extended or adjusted under 35 U.S.C. 154(b) by 915 days.

(21) Appl. No.: 12/000,521

(22) Filed: Dec. 13, 2007

(65) Prior Publication Data
US 2008/0167122 A1 Jul. 10, 2008

(30) Foreign Application Priority Data
Jan. 9, 2007 (JP) .................. 2007-001840

(51) Int. Cl.
 *A63F 9/14* (2006.01)
 *G06F 17/40* (2006.01)
(52) U.S. Cl. .................. 463/42; 463/6; 463/40; 463/43
(58) Field of Classification Search .................. 463/30, 463/42
 See application file for complete search history.

(56) References Cited

U.S. PATENT DOCUMENTS

| | | | | |
|---|---|---|---|---|
| 6,755,654 B2* | 6/2004 | Hightower | ............ | 434/69 |
| 6,869,363 B2* | 3/2005 | Okitsu et al. | ............ | 463/29 |
| 7,004,839 B2* | 2/2006 | Suzuki et al. | ............ | 463/42 |
| 7,214,133 B2* | 5/2007 | Jen et al. | ............ | 463/42 |
| 7,286,930 B2* | 10/2007 | Brass et al. | ............ | 701/207 |
| 7,798,905 B2* | 9/2010 | Thompson et al. | ............ | 463/42 |
| 7,803,054 B1* | 9/2010 | Ogus et al. | ............ | 463/42 |
| 2003/0050118 A1* | 3/2003 | Suzuki et al. | ............ | 463/42 |
| 2003/0236111 A1 | 12/2003 | Otani et al. | | |
| 2004/0224741 A1* | 11/2004 | Jen et al. | ............ | 463/6 |
| 2004/0225386 A1* | 11/2004 | Thompson et al. | ............ | 700/92 |

(Continued)

FOREIGN PATENT DOCUMENTS

EP 1 475 134 A2 11/2004

(Continued)

OTHER PUBLICATIONS

Inin0. What is "rubberband" AI?. In TeamXbox Forum [online]. Mar. 2, 2003 [retrieved on May 11, 2011]. Retrieved from the Internet: <URL:/http://forum.teamxbox.com/showthread.php?t=181536>.*

(Continued)

*Primary Examiner* — Dmitry Suhol
*Assistant Examiner* — Carl V Larsen
(74) *Attorney, Agent, or Firm* — Oliff & Berridge, PLC

(57) ABSTRACT

In a car racing game, one player is given a crown in racecourse units which indicates that the player is the fastest player (champion) of the racecourse. A player can play a crown competition with the player possessing the crown aiming to acquire the crown. For example, when a player Px challenges the crown of the racecourse 1, the player Px operates a player's car PC and plays a match against a player Pa who is a crown-possessing player of the racecourse 1. Specifically, the player Px plays a match against a ghost car GC controlled based on ghost data Ga1 of the player Pa for the racecourse 1. When the player Px has won the match, the crown of the racecourse 1 possessed by the player Pa is transferred to (acquired by) the player Px.

16 Claims, 37 Drawing Sheets

~CHALLENGE CROWN COMPETITION!!~

SELECT OPPONENT PLAYER?

U.S. PATENT DOCUMENTS

| | | | |
|---|---|---|---|
| 2004/0266506 A1 | 12/2004 | Herbrich et al. | |
| 2004/0267386 A1 | 12/2004 | Hightower | |
| 2006/0003825 A1* | 1/2006 | Iwasaki et al. | 463/2 |
| 2006/0154713 A1* | 7/2006 | Sunazuka et al. | 463/6 |
| 2006/0241795 A1* | 10/2006 | Weingardt et al. | 700/91 |
| 2007/0060359 A1* | 3/2007 | Smith | 463/42 |
| 2007/0066403 A1* | 3/2007 | Conkwright | 463/43 |
| 2007/0191101 A1* | 8/2007 | Coliz et al. | 463/42 |
| 2007/0191102 A1* | 8/2007 | Coliz et al. | 463/42 |
| 2008/0064488 A1* | 3/2008 | Oh | 463/25 |
| 2008/0113815 A1* | 5/2008 | Weingardt | 463/42 |
| 2008/0167121 A1* | 7/2008 | Maeda et al. | 463/30 |
| 2009/0149248 A1* | 6/2009 | Busey et al. | 463/29 |

FOREIGN PATENT DOCUMENTS

| | | |
|---|---|---|
| EP | 1 479 422 A2 | 11/2004 |
| EP | 1 595 585 A2 | 11/2005 |
| GB | 2 436 724 A | 10/2007 |
| JP | A 2003-320164 | 11/2003 |
| JP | A-2006-043439 | 2/2006 |
| JP | A-2006-174916 | 7/2006 |
| JP | A-2006-271473 | 10/2006 |
| JP | A-2006-280453 | 10/2006 |
| WO | WO 2007/022487 A2 | 2/2007 |

OTHER PUBLICATIONS

Gerstmann, Jeff. Midnight Club II Review. Gamespot [online]. Apr. 10, 2003 [retrieved on May 11, 2011]. Retrieved from the Internet: <URL:http://www.gamespot.com/ps2/driving/midnightclub2/review.html>.*

* cited by examiner

RC  AC  PC  GC

◆ "PLAYER Pa" PLAYS MATCH AGAINST "PLAYER Pb" ON "RACECOURSE 1"

◆"PLAYER XPx" CHALLENGES CROWN COMPETITION ON "RACECOURSE 1"!

PLAY DATA 334e

| CONTROL POINT | POSITION | POSTURE | VELOCITY VECTOR | SPEED |
|---|---|---|---|---|
| Q1 | d1 | (x1, y1, z1) | (x1, z1) | V1 |
| Q2 | d2 | (x2, y2, z2) | (x2, z2) | V2 |
| Q3 | d3 | (x3, y3, z3) | (x3, z3) | V3 |
| ⋮ | ⋮ | ⋮ | ⋮ | ⋮ |
| Qn | dn | (xn, yn, zn) | (xn, zn) | Vn |

334e-1, 334e-2, 334e-3, 334e-4, 334e-5

TRAVEL PATTERN DATA

<RACECOURSE: MOUNTAIN ROAD>

<RACECOURSE: COASTLINE>

TRAVEL PATTERN DATA <#1> <#2>

323

CROWN COMPETITION STATE DATA

| RACECOURSE | MATCH FLAG | CHALLENGE PLAYER |
|---|---|---|
| COASTLINE | 1 | JIRO |
| MOUNTAIN ROAD | 0 | — |
| ⋮ | ⋮ | ⋮ |

336a  336  336b  336c

RUBBER BAND COEFFICIENT Kr

◆"PLAYER Px" AIMS TO ACQUIRE CHALLENGE RIGHT OF "RACECOURSE 1" !!

FIG. 31

~ SELECT MATCH MODE ~

NORMAL MATCH

CROWN COMPETITION

FIG. 38

733 CHALLENGE RIGHT-POSSESSING PLAYER DATA

| | | |
|---|---|---|
| 733a — STORE | STORE A | |
| 733b — RACECOURSE | CHALLENGING RIGHT-POSSESSING PLAYER (733c) | ACQUISITION DATE (733d) |
| COASTLINE | TARO | 2006/12/18 |
| MOUNTAIN ROAD | HAYASHI | 2006/11/25 |
| ⋮ | ⋮ | ⋮ |

FIG. 39

734 CHALLENGE RIGHT COMPETITION STATE DATA

| | | |
|---|---|---|
| 734a — STORE | STORE A | |
| 734b — RACECOURSE | MATCH FLAG (734c) | CHALLENGE PLAYER (734d) |
| COASTLINE | 0 | — |
| MOUNTAIN ROAD | 0 | — |
| ⋮ | ⋮ | ⋮ |

FIG. 40

CROWN-POSSESSING PLAYER DATA 731

| RACECOURSE 731a | CROWN-POSSESSING PLAYER 731b | ACQUISITION DATE 731c |
|---|---|---|
| COASTLINE | STAR | 2006/12/17 |
| MOUNTAIN ROAD | ATOM | 2006/12/04 |
| ⋮ | ⋮ | ⋮ |

FIG. 41

CROWN COMPETITION STATE DATA 732

| RACECOURSE 732a | MATCH FLAG 732b | CHALLENGE PLAYER 732c |
|---|---|---|
| COASTLINE | 0 | — |
| MOUNTAIN ROAD | 0 | — |
| ⋮ | ⋮ | ⋮ |

# GAME DEVICE, SERVER DEVICE, GAME PROCESS CONTROL METHOD, AND INFORMATION STORAGE MEDIUM

Japanese Patent Application No. 2007-1840 filed on Jan. 9, 2007, is hereby incorporated by reference in its entirety.

BACKGROUND OF THE INVENTION

The present invention relates to a game device and the like.

A racing game has been popular in which players compete in a race while operating (controlling) cars, motorcycles, or the like. Such a racing game has various modes such as a mode in which a player competes with another player for ranking and a mode in which a player competes for speed. A racing game system is known in which a ghost car appears in a game space. A ghost car is computer-controlled based on the player's previous play data which has been stored, and reproduces the previous travel state of the player (see JP-A-2003-320164, for example).

However, a race with a ghost car implemented by a known system lacks interest as compared with a race with the actual player. Specifically, since a related-art ghost car reproduces the previous travel state of the player, such a system merely implements a game play for competing for speed using only the player's car.

SUMMARY

According to one aspect of the invention, there is provided a game device comprising:

a play data storage section which stores play data of each player recorded in a form available as control data of a computer-controlled character (hereinafter called "COM character") and identification information of the player while associating the play data with the identification information;

a champion management section which manages one of the players as a champion;

a login section which performs a specific login process to specify a present player;

a match process section which performs a match process by controlling the COM character based on the play data stored in the play data storage section and belonging to the player managed as the champion by the champion management section and controlling a player's character based on an operation input of the present player; and a play data update section which updates the play data of the player stored in the play data storage section based on the play data of the player during the match process of the match process section;

the champion management section allowing the champion to remain unchanged when the present player has lost the match as a result of the match process of the match process section, and managing the present player as a new champion when the present player has won the match as a result of the match process of the match process section.

BRIEF DESCRIPTION OF THE SEVERAL VIEWS OF THE DRAWING

FIG. 31 shows an example of a match mode selection screen.
FIG. 38 shows a data configuration example of challenge right-possessing player data.
FIG. 39 shows a data configuration example of challenge right competition state data.
FIG. 40 shows a data configuration example of crown-possessing player data.

FIG. 41 shows a data configuration example of crown competition state data.

DETAILED DESCRIPTION OF THE EMBODIMENT

Figure 1:
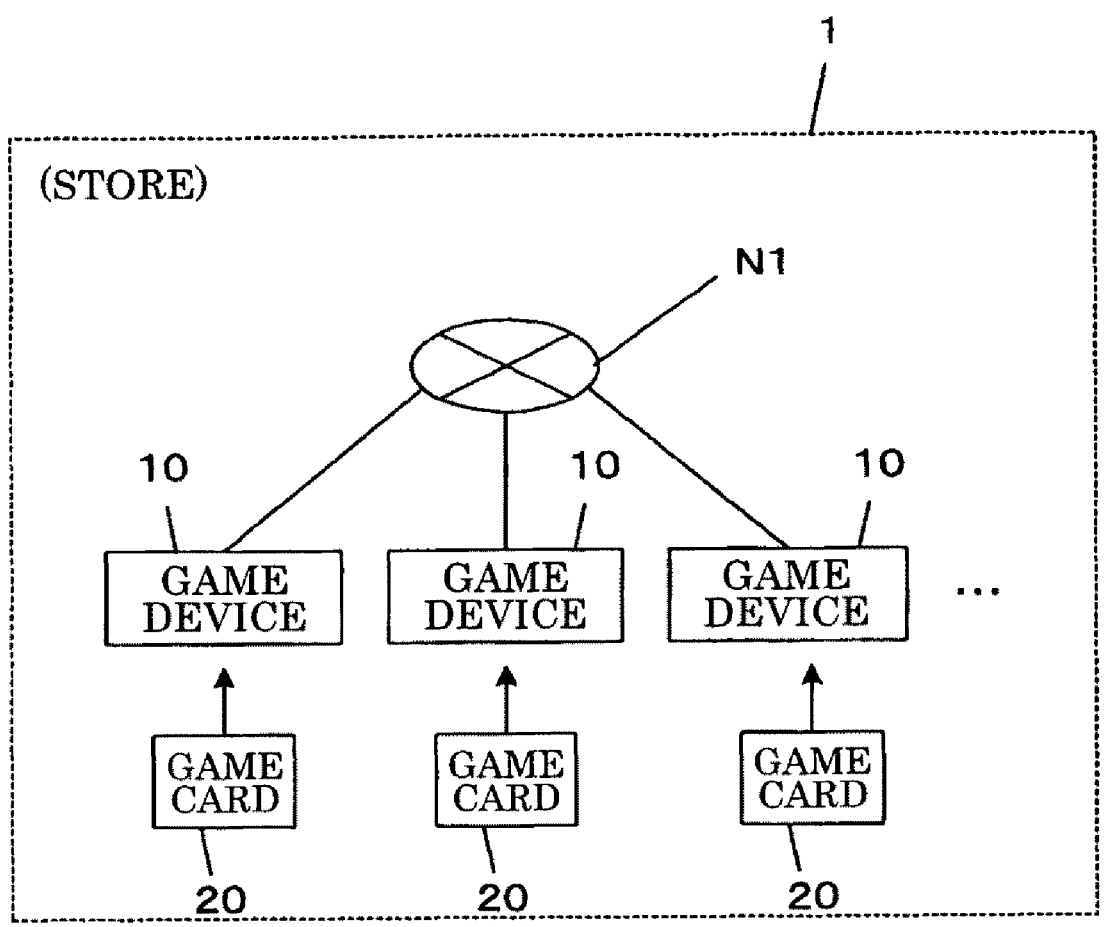
FIG. 1 is a view showing the configuration of a game system according to a first embodiment.

The invention may increase interest in a match against a ghost car.

According to one embodiment of the invention, there is provided a game device comprising:

a play data storage section which stores play data of each player recorded in a form available as control data of a computer-controlled character (hereinafter called "COM character") and identification information of the player while associating the play data with the identification information;

a champion management section which manages one of the players as a champion;

a login section which performs a specific login process to specify a present player;

a match process section which performs a match process by controlling the COM character based on the play data stored in the play data storage section and belonging to the player managed as the champion by the champion management section and controlling a player's character based on an operation input of the present player; and a play data update section which updates the play data of the player stored in the play data storage section based on the play data of the player during the match process of the match process section;

the champion management section allowing the champion to remain unchanged when the present player has lost the match as a result of the match process of the match process section, and managing the present player as a new champion when the present player has won the match as a result of the match process of the match process section.

According to another embodiment of the invention, there is provided a game process control method comprising causing a computer to:

store play data of each player recorded in a form available as control data of a COM character and identification information of the player while associating the play data with the identification information;

manage one of the players as a champion; perform a specific login process to specify a present player;

perform a match process by controlling the COM character based on the play data stored in the play data storage section and belonging to the player managed as the champion by the champion management section and controlling a player's character based on an operation input of the present player;

update the play data of the player stored in the play data storage section based on the play data of the player during the match process of the match process section; and allow the champion to remain unchanged when the present player has lost the match as a result of the match process, and manage the present player as a new champion when the present player has won the match as a result of the match process.

According to the above embodiment, the match process is performed using the COM character controlled based on the play data stored and belonging to the player managed as the champion and the player's character controlled based on the operation input of the present logged-in player. The play data of the player is updated based on the play data during the match process. When the player has won the match as a result of the match process, the player is managed as a new champion. Specifically, since the player can become a new champion when the player wins a match against the COM character controlled based on the play data of the player managed as the champion (i.e., champion's COM character) (i.e., championship), a more exciting match is realized as compared with a simple match against the COM character. Moreover, the player can play a championship at any time irrespective of whether or not the player managed as the champion can participate in the game.

In the game device according to this embodiment, the play data may include a parameter for controlling the COM character;

the champion management section may manage the day when the player became the champion; and the match process section may control the COM character while changing a value of the parameter included in the play data depending on the number of days elapsed from the day when the player became the champion managed by the champion management section.

According to the above configuration, the COM character is controlled while changing the value of the parameter included in the play data depending on the number of days elapsed from the day when the player became the champion. Therefore, even if the COM character has a very high capability and is strong when becoming the champion, the COM character is likely to be defeated due to a gradual decrease in capability with the lapse of days by changing the value of the parameter so that the capability of the COM character decreases as the number of days elapsed from the day when the player became the champion increases, whereby replacement of the champion can be promoted, for example.

In the game device according to this embodiment, when the player managed as the champion by the champion management section has been specified as the present player by the login process and has defeated a COM character controlled based on the play data of the player as a result of the match process, the play data update section may update the play data of the player stored in the play data storage section based on the play data when the player defeated the COM character, and the champion management section may update the day when the player became the champion with the day when the player defeated the COM character.

According to the above configuration, when the player managed as the champion has defeated the COM character controlled based on the play data of the player, the play data of the player is updated based on the play data when the player defeated the COM character, and the day when the player became the champion is updated with the day when the player defeated the COM character. Specifically, the player who has become the champion can update the stored play data and the day when the player became the champion by defeating the COM character controlled based on the play data of the player. Therefore, when the capability of the COM character decreases as the number of days elapsed from the day when the player became the champion increases, the player can prevent a decrease in capability of the player's COM character by regularly playing a match against the player's COM character after becoming the champion, for example. This prompts the player to play the game more frequently.

In the game device according to this embodiment, the play data storage section may store the play data in units of game-playable game stages;

the champion management section may manage the champions in units of the game stages;

the game device further may comprise an opponent champion selection section which selects an opponent champion from the champions in units of the game stages managed by the champion management section; and the match process section may perform the match process in a game stage corresponding to the champion selected by the opponent champion selection section by controlling the COM character based on the play data of the champion in the game stage.

According to the above configuration, the champions are managed in units of game stages, and a match against the COM character of the champion is performed in the game stage of the champion. This provides the player with a variety of interest in game play, such as challenging the champion in a favorite game stage or challenging the champion in a difficult game stage.

The game device according to this embodiment may further comprise:

a player information management section which manages player information including at least a play level and/or a play match record of each of the players; and a match permission determination section which determines whether or not to allow a match between the present player specified by the login process and the champion based on the player information of the present player;

the match process section may not perform the match process when the match permission determination section has determined not to allow the match, and may perform the match process when the match permission determination section has determined to allow the match.

According to the above configuration, the player information including at least the play level and/or the play match record of each player is managed, and whether or not to allow a match between the present logged-in player and the COM character of the champion is determined based on the managed player information. Therefore, a player who does not have a specific play level or match record cannot play a match against the COM character of the champion.

The game device according to this embodiment may comprise a data update section which communicates with another game device and updates the information stored in the play data storage sections of the game devices and the information managed by the champion management sections of the game devices with identical and latest information.

According to the above configuration, the game device communicates with another game device, and the information stored in the game devices is updated with identical and latest information. Specifically, identical and latest information is always stored in different game devices. This enables the player to enjoy a similar game play using any of the game devices.

According to a further embodiment of the invention, there is provided a server device capable of communicating with a game device which performs a match process by controlling a COM character and controlling a player's character based on an operation input of a player, the server device comprising:

a play data storage section which stores play data of each player recorded in a form available as control data of the COM character and identification information of the player while associating the play data with the identification information;

a champion management section which manages one of the players as a champion;

a champion play data transmission section which transmits the play data stored in the play data storage section and belonging to the player managed as the champion by the champion management section to the game device for use as control data of the COM character in the match process; and a play data update section which receives the play data of the player during the match process from the game device, and updates the play data of the player stored in the play data storage section based on the received play data;

the champion management section allowing the champion to remain unchanged when the player has lost the match as a result of the match process of the game device, and managing the player as a new champion when the player has won the match as a result of the match process of the game device.

According to the above configuration, the play data stored and belonging to the player managed as the champion is transmitted to the game device, and the game device performs the match process between the COM character controlled based on the transmitted play data of the champion and the player's character controlled based on the operation input of the present player. The play data of the player is updated based on the play data during the match process received from the game device, and the player is managed as a new champion when the player has won the match. Specifically, since the player can become a new champion when the player wins a match against the COM character controlled based on the play data of the player managed as the champion (i.e., champion's COM character) (i.e., championship) performed in the game device, a more exciting match is realized as compared with a simple match against the COM character.

In the server device according to this embodiment, the play data storage section may store the play data in units of game-playable game stages in the game device;

the champion management section may manage the champions in units of the game stages;

the server device further may comprise a champion select signal reception section which receives from the game device a select signal which selects an opponent champion from the champions in units of the game stages managed by the champion management section; and the champion play data transmission section may transmit to the game device the play data of the champion selected based on the received select signal in the game stage managed by the champion management section as the champion.

According to the above configuration, the champions are managed in units of game stages, and the play data of the champion selected based on the select signal received from the game device relating to the game stage of the champion is transmitted to the game device. Specifically, a match between the payer and the champion's COM character in the game device is performed in the game stage of the champion. This provides the player with a variety of interest in game play, such as challenging the champion in a favorite game stage or challenging the champion in a difficult game stage.

The server device according to this embodiment may further comprise:

a challenger management section which manages a player allowed to play a match against the champion as a challenge right-possessing player;

a challenge permission determination section which performs a specific communication with the game device and determines whether or not the present player of the game device is managed as the challenge right-possessing player by the challenger management section; and a challenge right-possessing player play data transmission section which transmits the play data of the player managed as the challenge right-possessing player by the challenger management section to the game device when the challenge permission determination section has determined that the present player of the game device is not managed as the challenge right-possessing player by the challenger management section;

wherein the champion play data transmission section may not transmit the play data of the player managed as the champion when the challenge permission determination section has determined that the present player of the game device is not managed as the challenge right-possessing player by the challenger management section; and wherein the challenger management section may allow the challenge right-possessing player to remain unchanged when the present player of the game device has lost the match as a result of the match process, and may manage the player as a new challenge right-possessing player when the player has won the match as a result of the match process.

According to the above configuration, the player allowed to play a match against the champion is managed as the challenge right-possessing player. When it has been determined that the present player of the game device is not the challenge right-possessing player, the play data of the champion player is not transmitted to the game device, and the play data of the player managed as the challenge right-possessing player is transmitted to the game device. The game device performs the match process between the player and the COM character controlled based on the transmitted play data of the challenge right-possessing player, and the player is managed as a new challenge right-possessing player when the player has won the match. Specifically, the player of the game device can play a match against the champion's COM character only when the player is the challenge right-possessing player. In other words, in order to play a match against the champion, the player must play a match against another player who is the challenge right-possessing player and win the match to become the challenge right-possessing player. This makes the championship more exciting.

According to a further embodiment of the invention, there is provided a game device capable of communicating with the above server device, the game device comprising:

a login section which performs a specific login process to specify a present player;

a match process section which performs a match process by controlling the COM character based on the play data of the player managed as the champion by the server device transmitted from the server device and controlling a player's character based on an operation input of the present player; and a match process play data transmission section which transmits the play data of the player during the match process of the match process section to the server device.

According to a further embodiment of the invention, there is provided a game process control method for a computer capable of communicating with the above server device, the method comprising causing the computer to:

perform a specific login process to specify a present player;

perform a match process by controlling a COM character based on the play data of the player managed as the champion by the server device transmitted from the server device and controlling a player's character based on an operation input of the present player; and transmit the play data of the player during the match process to the server device.

According to the above configuration, the match process is performed between the COM character controlled based on the play data of the champion received from the server device and the player's character controlled based on the operation input of the present logged-in player. The play data during the match process is transmitted to the server device. The server device updates the play data of the player based on the transmitted play data, and the player is managed as a new champion when the player has won the match. Specifically, since the player can become a new champion when the player wins a match against the COM character controlled based on the play data of the player managed as the champion (i.e., champion's COM character) (i.e., championship), a more exciting match is realized as compared with a simple match against the COM character.

In the game device according to this embodiment, the champion management section of the server device may manage the day when the player became the champion;

the play data may include a parameter for controlling the COM character;

the game device may further comprise a champion day reception section which receives the day when the player became the champion managed by the champion management section; and the match process section may control the COM character while changing a value of the parameter included in the play data depending on the number of days elapsed from the day when the player became the champion received by the champion day reception section.

According to the above configuration, the COM character is controlled while changing the value of the parameter included in the received play data of the champion depending on the number of days elapsed from the day when the player became the champion which is received from the server device. Therefore, even if the COM character has a very high capability and is strong when becoming the champion, the COM character is likely to be defeated due to a gradual decrease in capability with the lapse of days by changing the value of the parameter so that the capability of the COM character decreases as the number of days elapsed from the day when the player became the champion increases, whereby replacement of the champion can be promoted, for example.

According to a further embodiment of the invention, there is provided a computer-readable information storage medium storing a program for causing a computer to execute the above game process control method.

The term "information storage medium" used herein refers to a storage medium, such as a hard disk, an MO, a CD-ROM, a DVD, a memory card, or an IC memory, from which the stored information can be read by a computer.

According to the embodiment, the match process is performed using the COM character controlled based on the play data stored and belonging to the player managed as the champion and the player's character controlled based on the operation input of the present logged-in player. The play data of the player is updated based on the play data during the match process. When the player has won the match as a result of the match process, the player is managed as a new champion. Specifically, since the player can become a new champion when the player wins a match against the COM character controlled based on the play data of the player managed as the champion (i.e., champion's COM character) (i.e., championship), a more exciting match is realized as compared with a simple match against the COM character. Moreover, the player can play a championship at any time irrespective of whether or not the player managed as the champion can participate in the game.

Preferred embodiments of the invention are described below with reference to the drawings. The following description illustrates an arcade game device which executes a car racing game. Note that the embodiments to which the invention can be applied are not limited thereto.

First Embodiment

A first embodiment is described below.
Game System

FIG. 1 is a view showing the configuration of a game system 1 according to the first embodiment. As shown in FIG. 1, the game system 1 is configured by connecting game devices 10 installed in a single store with a communication line N1 such as a LAN provided in the store. The game device 10 is a game device for a player to play a game. The game device 10 is implemented by an arcade game device or the like, and executes a car racing game.

Figure 2:
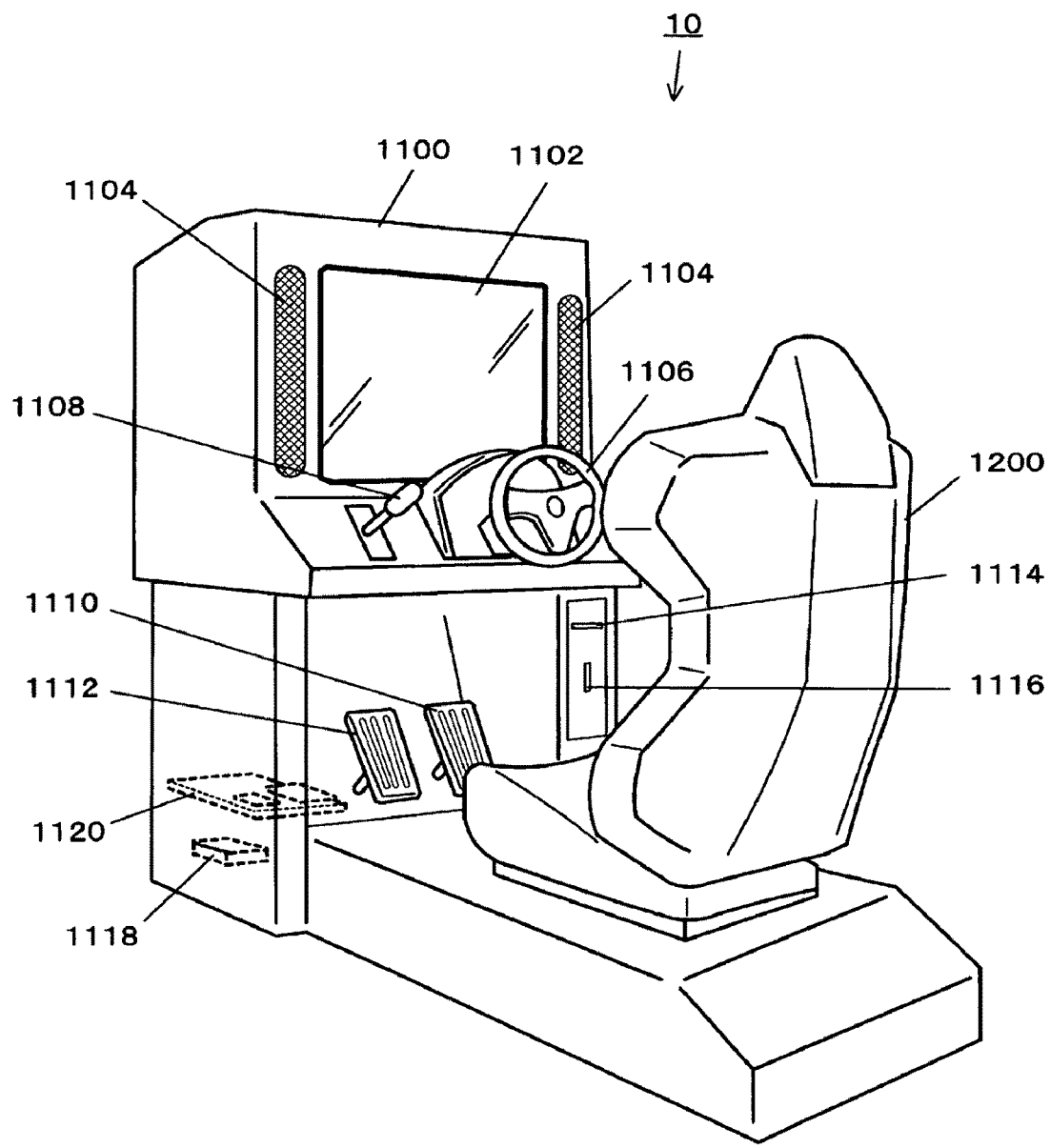
FIG. 2 shows an example of the outward appearance of a game device.

FIG. 2 is a view showing an example of the outward appearance of the game device 10. As shown in FIG. 2, the game device 10 is formed to imitate a driver's seat of a racing car, and includes a housing 1100 and a seat 1200. A display 1102 for displaying a game screen, a speaker 1104 for outputting game sound, a steering wheel 1106, a gear lever 1108, an accelerator pedal 1110, and a brake pedal 1112 for a player to input game operations are provided at the front of the housing 1100. A card insertion slot 1114 for inserting a game card 20 and a token insertion slot 1116 for inserting a token, a coin, or the like for playing the game are provided at the lower front of the housing 1100. A player obtains the game card 20 in advance by purchase or the like. The game card 20 is implemented by an IC card including a contact-type IC chip (e.g., mu-chip) in which data such as a specific card ID is recorded.

A communication device 1118 for connecting with the communication line N1 and a control unit 1120 including a CPU, an image generation IC, a sound generation IC, a ROM, a RAM, a hard disk, an IC memory, and the like are provided in the housing 1100. The CPU performs a game process for implementing the car racing game based on a program and data read from the IC memory and the like, data read from the game card 20 inserted into the card insertion slot 1114, operation signals input from the steering wheel 1106 and the like. The player takes a seat 1200, and enjoys the car racing game by operating the steering wheel 1106, the gear lever 1108, the accelerator pedal 1110, and the brake pedal 1112 while watching the game screen displayed on the display 1102 and listening to the game sound output from the speaker 1104.

Outline of Game

In the car racing game according to this embodiment, the player operates a player's car (player's character) and plays a match against a ghost car of another player (hereinafter referred to as "ghost match").

Figure 3:
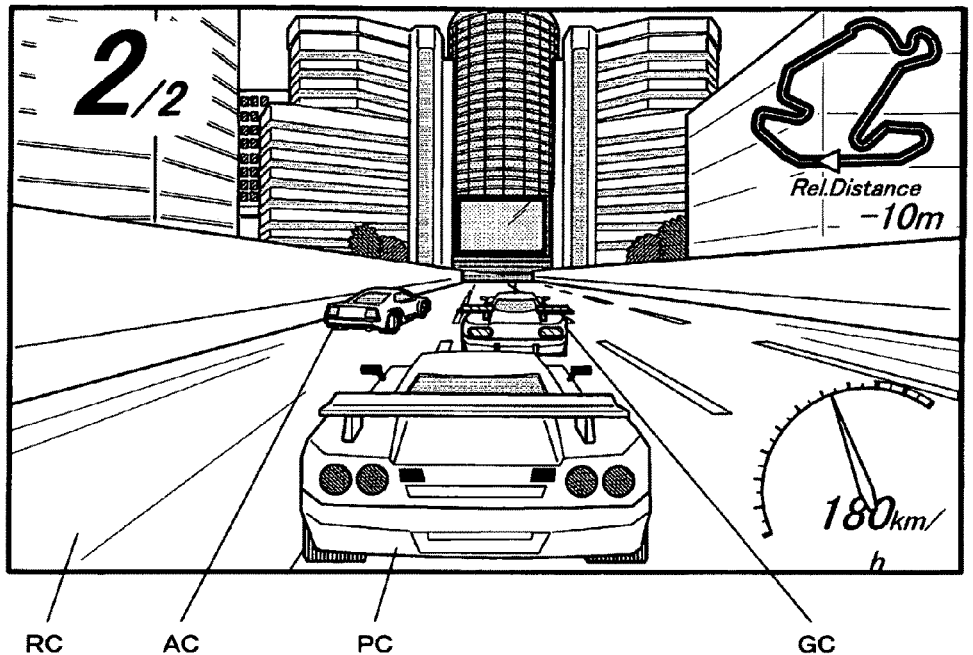
FIG. 3 shows an example of a game screen.

FIG. 3 is a view showing an example of the game screen displayed on the display 1102. As shown in FIG. 3, a player's car PC operated by the player, a ghost car GC of another player (opponent player) who is the opponent of the player, and another car AC are displayed in the game screen as racing cars traveling on a racecourse RC. The ghost car GC is a computer-controlled character (COM character) controlled based on ghost data which is the previous play data of the opponent player. Therefore, the player plays a match against the ghost car GC which reproduces the previous travel state of the opponent player. The other car AC is an object which appears as an obstacle and is not involved in the race. The other car AC is computer-controlled based on specific control data. The player's car PC or the ghost car GC which has reached a specific finish line set on the racecourse RC earlier than the other wins the match (race).

Principle

The principle of the ghost match is described below. In this embodiment, play data when the player plays the game is stored in the game device 10 as ghost data. Specifically, data relating to the player's car PC such as the travel path, the travel speed, and the posture is stored as the play data. In this embodiment, two or more racecourses RC are provided. The ghost data is stored for each racecourse RC.

Figure 4:
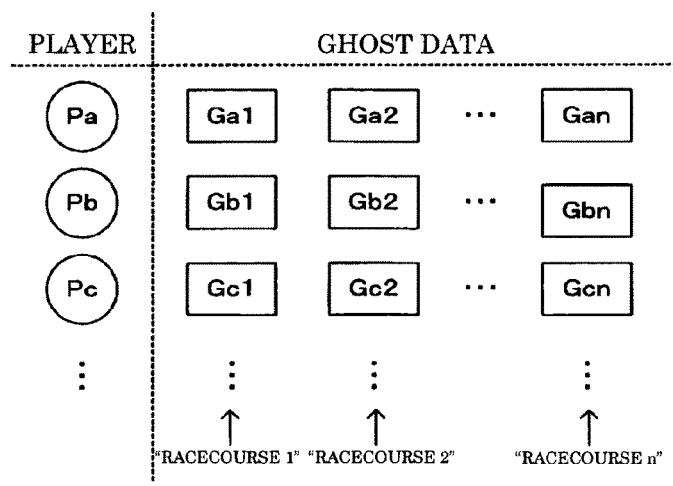
FIG. 4 is a view illustrative of a ghost match.

FIG. 4 is a view showing an example of the ghost data stored in the game device 10. As shown in FIG. 4, when n racecourses RC from a racecourse 1 to a racecourse n are provided in total, n pieces of ghost data G1 to Gn for respective racecourses are stored for respective players Pa, Pb, . . . . The ghost match is implemented by controlling the ghost car GC based on the ghost data G of the opponent player stored for the racecourse where the player plays a match. When the ghost match has completed, the ghost data G of the player stored for the racecourse where the player has played the match is updated with the play data during the match.

Figure 5A:
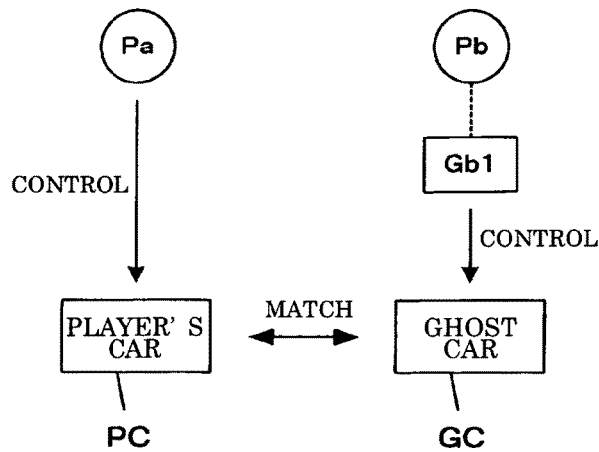
FIG. 5A and FIG. 5B are other views illustrative of a ghost match.
Figure 5B:
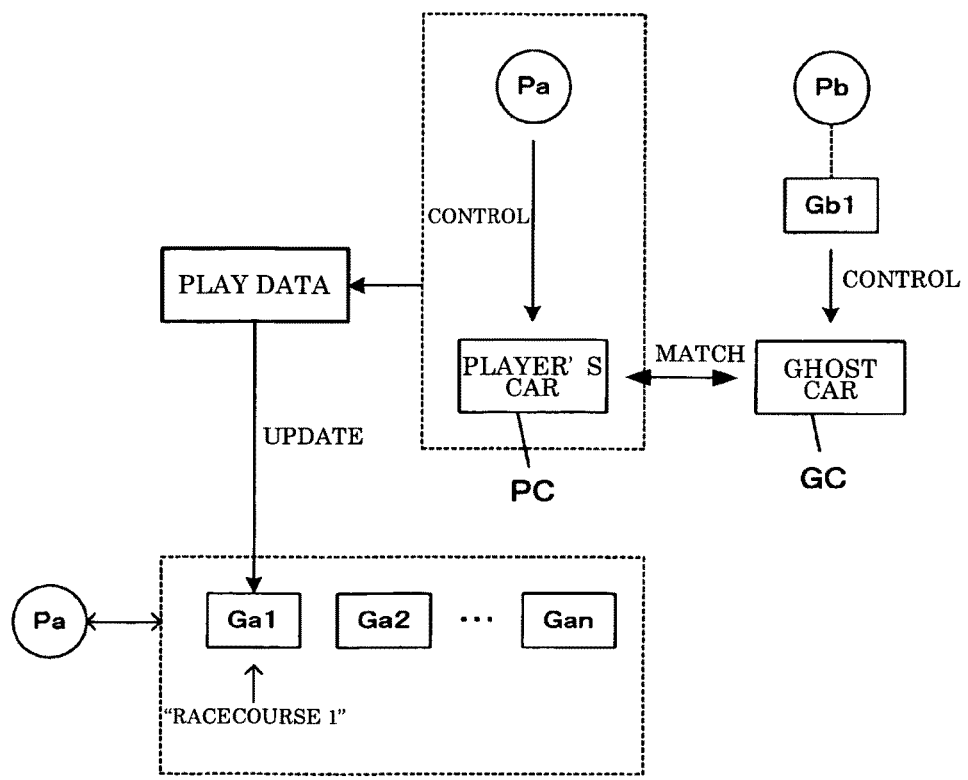

FIG. 5A and FIG. 5B are views showing an example of the ghost match. FIG. 5A and FIG. 5B show the case where the player Pa plays a match against the player Pb on the racecourse 1. As shown in FIG. 5A, the player's car PC is controlled based on the operation of the player Pa. The ghost data Gb1 of the opponent player Pb for the racecourse 1 is selected as the match ghost data, and the ghost car GC is controlled based on the match ghost data Gb1. Therefore, the player Pa can enjoy game play as if the player Pa were actually playing a match against the player Pb on the racecourse 1. When the match has completed, the ghost data Ga1 of the player Pa for the racecourse 1 is updated with the play data during the match, as shown in FIG. 5B. The player may select himself as the opponent, and may play a match against the ghost car GC controlled based on the player's ghost data.

Figure 6:
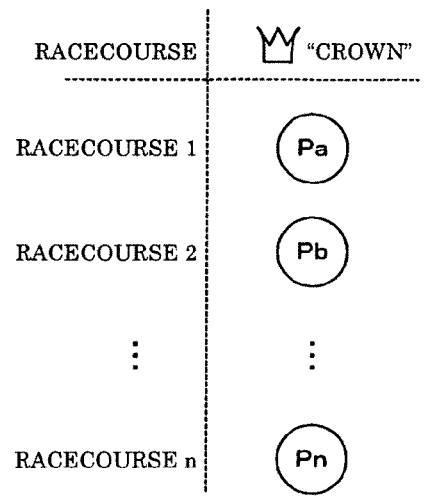
FIG. 6 is a view illustrative of the possession of a crown.

In the car racing game according to this embodiment, one player possesses a crown in racecourse units which indicates that the player is the strongest (fastest) player (champion) of the racecourse. FIG. 6 is a view showing an example of the possession of the crown. As shown in FIG. 6, when n racecourses RC from the racecourse 1 to the racecourse n are provided in total, n crowns of the respective racecourses exist in total, and n players P respectively possess these crowns. Note that one player can possess the crowns of different racecourses.

Figure 7A:
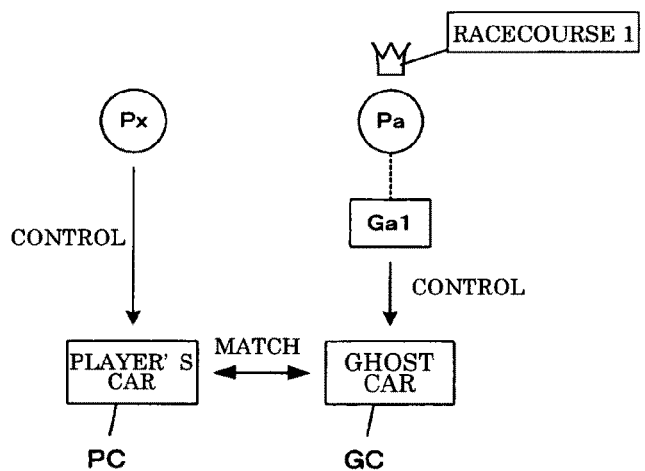
FIG. 7A and FIG. 7B are views illustrative of a crown competition.
Figure 7B:
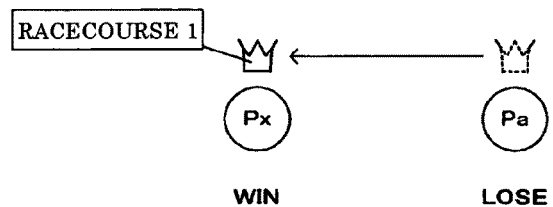

The player can play a crown competition in which the player plays a match against a player possessing the crown aiming to acquire the crown. FIG. 7A and FIG. 7B show an example of the crown competition. FIG. 7A and FIG. 7B show the case where the player Px aims to acquire the crown of the racecourse 1. In this case, the player Px plays a match against the player Pa which is the player possessing the crown of the racecourse 1 (crown-possessing player), as shown in FIG. 7A. Specifically, the player's car PC is controlled based on the operation of the player Px. The ghost data Ga1 of the opponent player Pa for the racecourse 1 is selected as the match ghost data, and the ghost car GC is controlled based on the match ghost data Ga1. As shown in FIG. 7B, when the player Px has won the match (WIN), the crown of the racecourse 1 possessed by the player Pa is transferred to the player Px. Specifically, the player Px has acquired the crown of the racecourse 1 from the player Pa. When the player Px has lost the match, the player Px fails to acquire the crown. Therefore, the player possessing the crown of the racecourse 1 remains unchanged.

Functional Configuration

Figure 8:
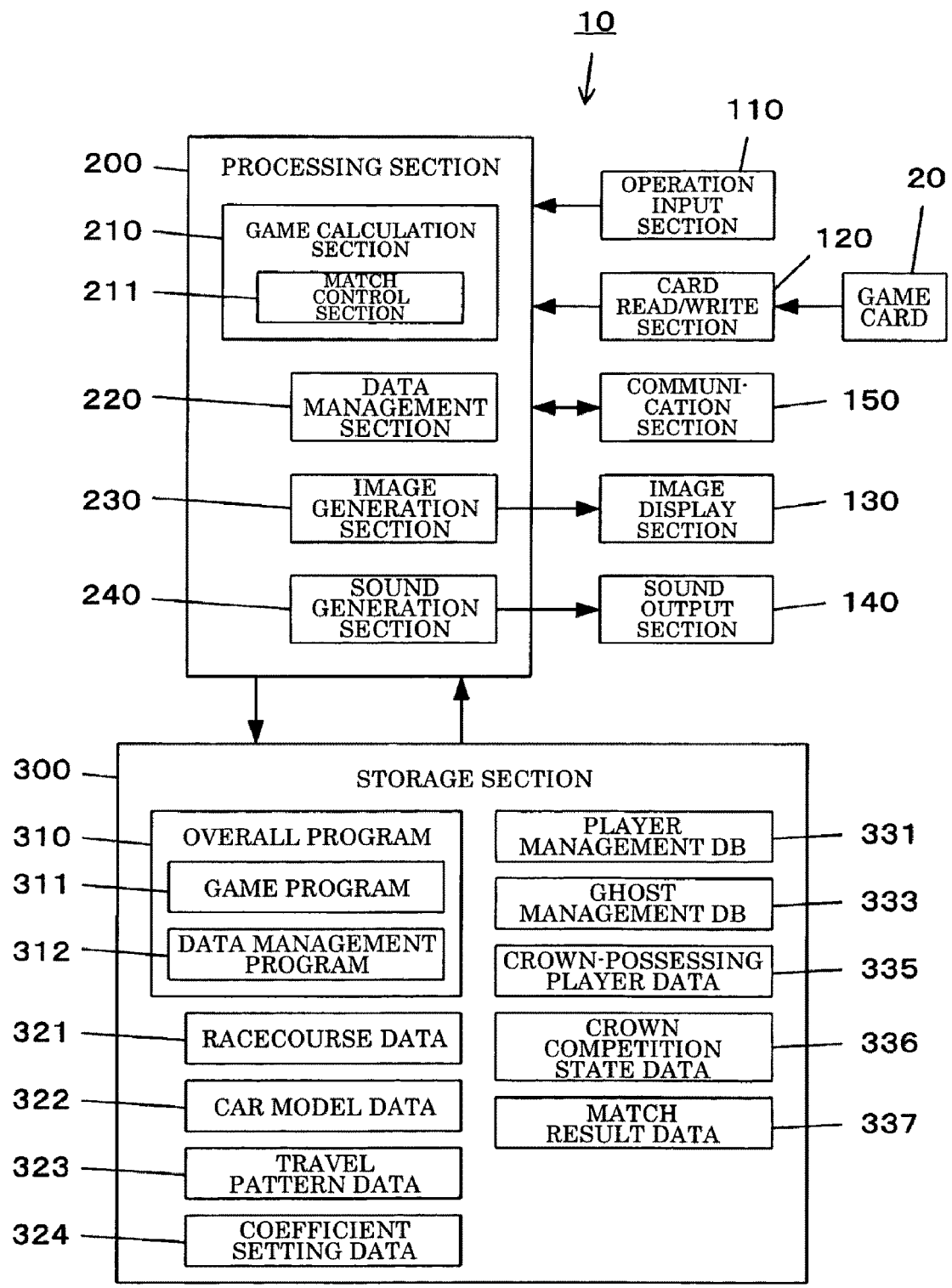
FIG. 8 is a functional configuration diagram of a game device.

FIG. 8 is a block diagram showing the functional configuration of the game device 10. As shown in FIG. 8, the game device 10 is functionally configured to include an operation input section 110, a card read/write section 120, a processing section 200, an image display section 130, a sound output section 140, a communication section 150, and a storage section 300.

The operation input section 110 receives a player's operation input and outputs operation data corresponding to the operation to the processing section 200. The function of the operation input section 110 is implemented by a button switch, a lever, a dial, a mouse, a keyboard, a touch panel, various sensors, and the like. In FIG. 2, the steering wheel 1106 and the like correspond to the operation input section 110.

The card read/write section 120 reads data recorded in the game card 20 and outputs the read data to the processing section 200. The card read/write section 120 records data indicated by a write instruction from the processing section 200 in the game card 20. In FIG. 2, the card insertion slot 1114 corresponds to the card read/write section 120.

The processing section 200 performs various calculations for controlling the entire game device 10, the game process, and the like based on a program and data stored in the storage section 300, operation data input from the operation input section 110, data received from an external device (mainly another game device 10) through the communication section 150, and the like. The function of the processing section 200 is implemented by a calculation device such as a processor (e.g., CPU (CISC or RISC) or DSP) or an ASIC (e.g., gate array) and its control program, for example. In FIG. 2, the CPU mounted on the control unit 1120 corresponds to the processing section 200. The processing section 200 includes a game calculation section 210 which mainly performs game calculations, a data management section 220 which manages various types of data used for the process of the game calculation section 210, an image generation section 230 which generates a display image of a display screen such as a game screen, and a sound generation section 240 which generates sound such as effect sound and background music (BGM).

The game calculation section 210 includes a match control section 211, and controls execution of the car racing game. Specifically, when the data read from the inserted game card 20 is input from the card read/write section 120, the game calculation section 210 performs a login process of specifying the player based on the input data.

Figure 9:
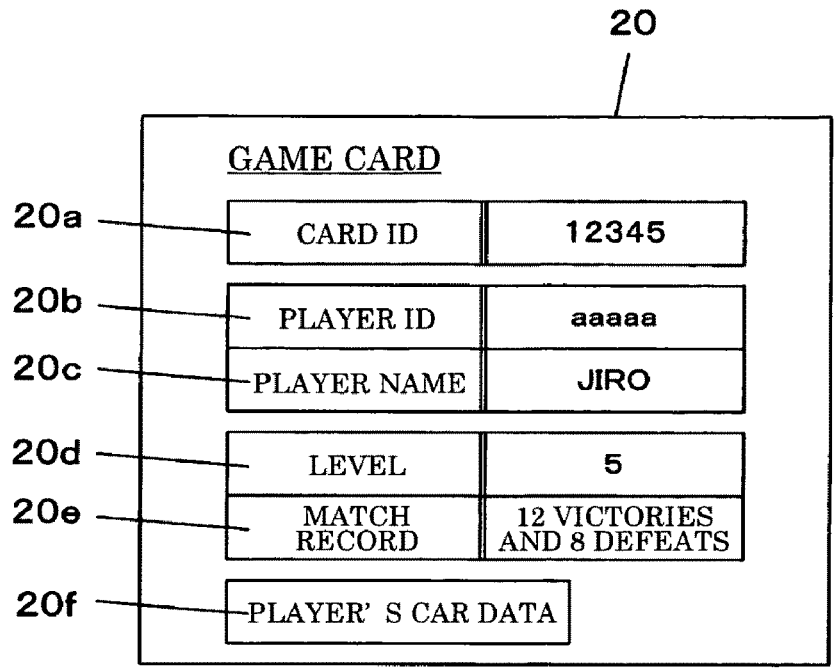
FIG. 9 shows a data configuration example of a game card.

FIG. 9 is a view showing an example of data stored in the game card 20. As shown in FIG. 9, a card ID 20a which is the identification number of the game card 20, a player ID 20b of the player possessing the game card 20, a player name 20c, a level 20d, a match record 20e, and player's car data 20f are stored in the game card 20. The player's car data 20f is data relating to the player's car PC of the player. For example, the name, body color, model, travel distance, and the like are stored as the player's car data 20f. Note that the surface of the game card 20 may be formed as a rewritable printing surface, and some (e.g., player name and level) or all of the recorded data may be rewritably printed on the printing surface.

Figure 10:
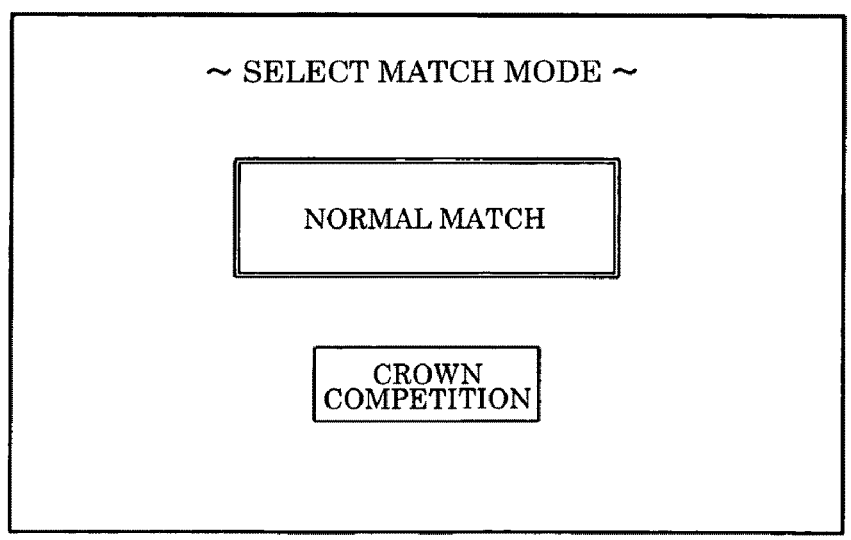
FIG. 10 shows an example of a match mode selection screen.

The game calculation section 210 then causes the image display section 130 to display a match mode selection screen for selecting the match mode. FIG. 10 is a view showing an example of the match mode selection screen. As shown in FIG. 10, a normal match mode and a crown competition mode are displayed in the match mode selection screen as the match modes. The normal match mode is a mode in which the player plays a normal match against another player, and the crown competition mode is a mode in which the player plays a match against a player possessing the crown aiming to acquire the crown.

When the player has selected the normal match mode using the match mode selection screen, the game calculation section 210 causes the image display section 130 to display a selection screen (not shown) for selecting the desired level of the opponent player and the desired racecourse. The game calculation section 210 extracts the players satisfying the selected level and racecourse as opponent candidates. Specifically, the game calculation section 210 refers to a player management DB 331 and a ghost management DB 333, and extracts the players who have the selected level and whose ghost data for the selected racecourse has been stored from all the players who have played the game.

Figure 11:
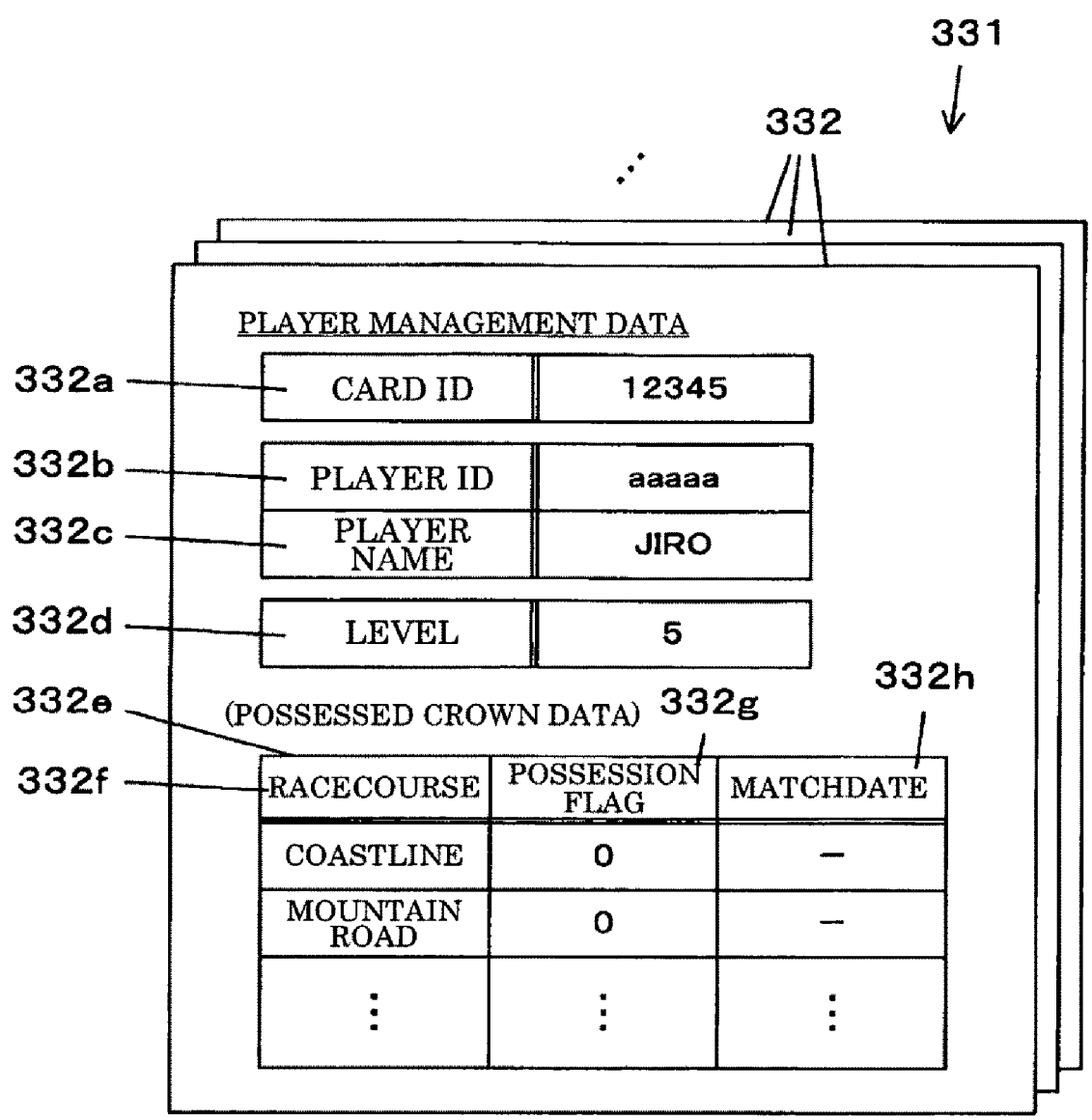
FIG. 11 shows a data configuration example of a player management DB.

FIG. 11 is a view showing an example of the data configuration of the player management DB 331. The player management DB 331 is a database (DB) for managing the data relating to the player, and includes two or more pieces of player management data 332. The player management data 332 is generated for each player. A card ID 332a of the game card 20 possessed by the player, a player ID 332b of the player, a player name 332c, a level 332d, and possessed crown data 332e are stored as the player management data 332. The possessed crown data 332e is data relating to the crown possessed by the player. A possession flag 332g and an acquisition date 332h are stored for each racecourse 332f while being associated with each other. The possession flag 332g is a flag indicating whether or not the player possesses the crown of the corresponding racecourse. The possession flag 332g is set at "1" when the player possesses the crown of the corresponding racecourse. The acquisition date 332h is the date when the player acquired the crown of the corresponding racecourse. The acquisition date 332h is stored when the player possesses the crown of the corresponding racecourse.

Figure 12:
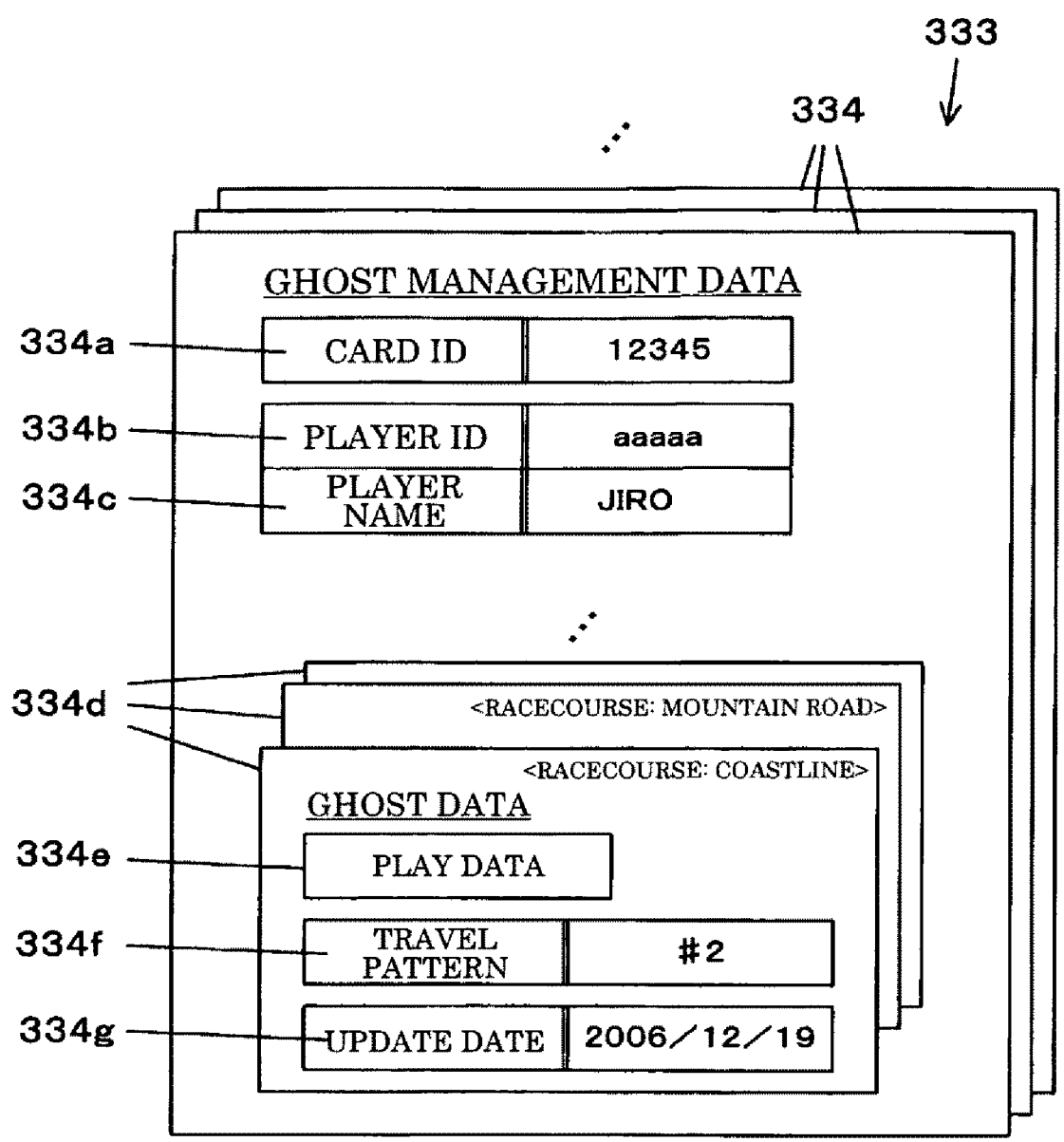
FIG. 12 shows a data configuration example of a ghost managing DB.

FIG. 12 is a view showing an example of the data configuration of the ghost management DB 333. The ghost management DB 333 is a database for managing the data relating to the player's ghost car, and includes two or more pieces of ghost management data 334. The ghost management data 334 is generated for each player. A card ID 334a of the game card 20 possessed by the player, a player ID 334b of the player, a player name 334c, and ghost data 334d are stored as the ghost management data 334. The ghost data 334d is generated for each racecourse. Play data 334e, a travel pattern 334f of the other car, and update date 334 are stored as the ghost data 334d. The play data 334e is travel data of the player's car PC during the previous game play of the player, and includes data relating to the travel path, travel speed, and posture.

Figures 13A, 13B:
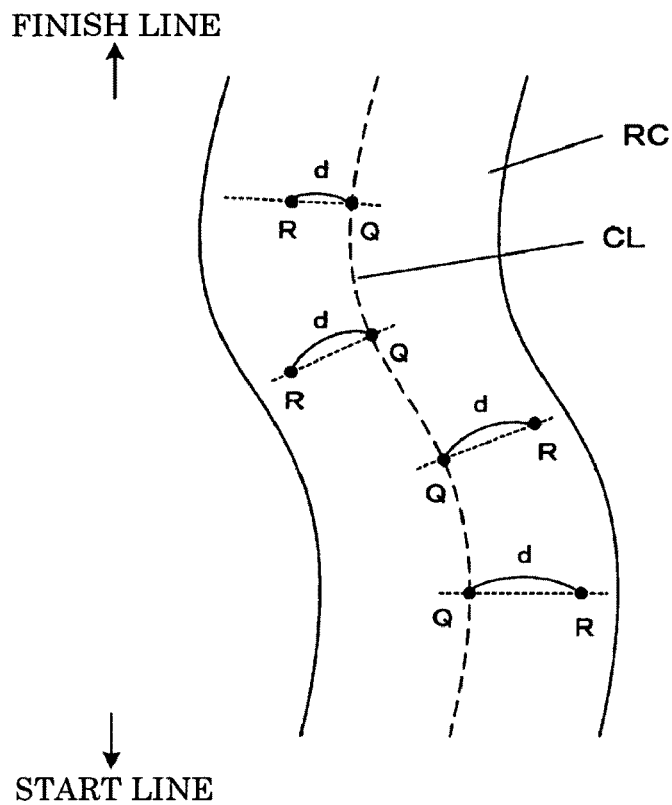
FIG. 13A and FIG. 13B show a data configuration example of play data.

FIG. 13A shows the travel path of the player's car PC. Specifically, control points Q are defined on the racecourse RC along its centerline CL at specific intervals from the start line. The position R of the player's car PC is defined by a distance d from each control point Q in the direction perpendicular to the centerline CL. The distance d is a positive or negative value depending on whether the position R is located on the right or left of the centerline CL with respect to the travel direction. Specifically, the distance d is a positive value when the position R is located on the right of the centerline CL with respect to the travel direction, and is a negative value when the position R is located on the left of the centerline CL with respect to the travel direction.

FIG. 13B is a view showing an example of the data configuration of the play data 334e. As shown in FIG. 13B, a position 334e-2, a posture 334e-3, a velocity vector 334e-4, and a speed 334e-5 are stored as the play data 334e for each control point 334e-1 while being associated with one another.

In FIG. 12, the travel pattern 334f is data indicating the travel pattern of the other car AC which has traveled along with the player's car PC. Specifically, the identification number of the corresponding travel pattern defined by the travel pattern data 323 is stored as the travel pattern 334f.

Figures 14, 15:
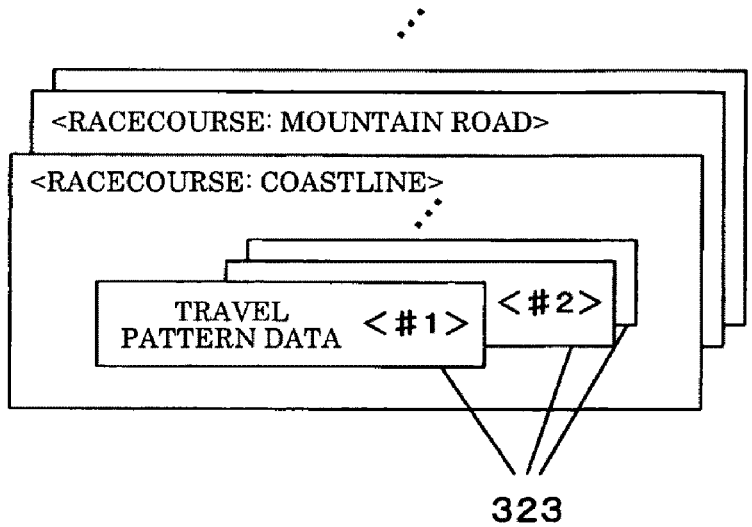
FIG. 14 shows a data configuration example of travel pattern data.
FIG. 15 shows a data configuration example of crown competition state data.

FIG. 14 is a view showing an example of the data configuration of the travel pattern data 323. As shown in FIG. 14, two or more pieces of travel pattern data 323 are stored for each racecourse. The travel pattern data 323 is a data table which defines the position, the travel speed, the posture, and the like of the other car AC for each control point Q defined on the corresponding racecourse RC in the same manner as the play data 334e.

The travel pattern 334f of the other car AC is stored as the ghost data 334d together with the play data 334e of the player's car PC since the player operates the player's car PC so that the player's car PC does not collide with the other car AC while seeing the other car AC. Specifically, the play data 334e which is the travel history data of the player's car PC corresponds to the travel state of the other car AC which has traveled along with the player's car PC.

The game calculation section 210 then causes the image display section 130 to display a player selection screen (not shown) in which the extracted players are listed as opponent candidates. When the player has selected one of the players using the player selection screen, the game calculation section 210 determines the selected player to be the opponent player and determines the racecourse selected in advance to be the match racecourse. A match between the player and the opponent player is carried out on the match racecourse under control of the match control section 211.

When the player has selected the crown competition mode as the match mode, the game calculation section 210 refers to crown competition state data 336 and determines the racecourse where another player is currently playing a match (crown competition) against the player possessing the crown.

FIG. 15 is a view showing an example of the data configuration of the crown competition state data 336. As shown in FIG. 15, a match flag 336b and a challenge player 336c are stored as the crown competition state data 336 for each racecourse 336a while being associated with each other. The match flag 336b is a flag indicating whether or not the player is participating in a crown competition on the corresponding racecourse. The match flag 336b is set at "1" when the player is participating in a crown competition on the corresponding racecourse. The name of the player who is participating in a crown competition on the corresponding racecourse is stored as the challenge player 336c.

The game calculation section 210 then refers to crown-possessing player data 335 and causes the image display section 130 to display an opponent player selection screen in which the players possessing the crown are listed in racecourse units. In this case, the player possessing the crown of the racecourse where a crown competition is held is displayed as a player who cannot be selected.

Figure 16:
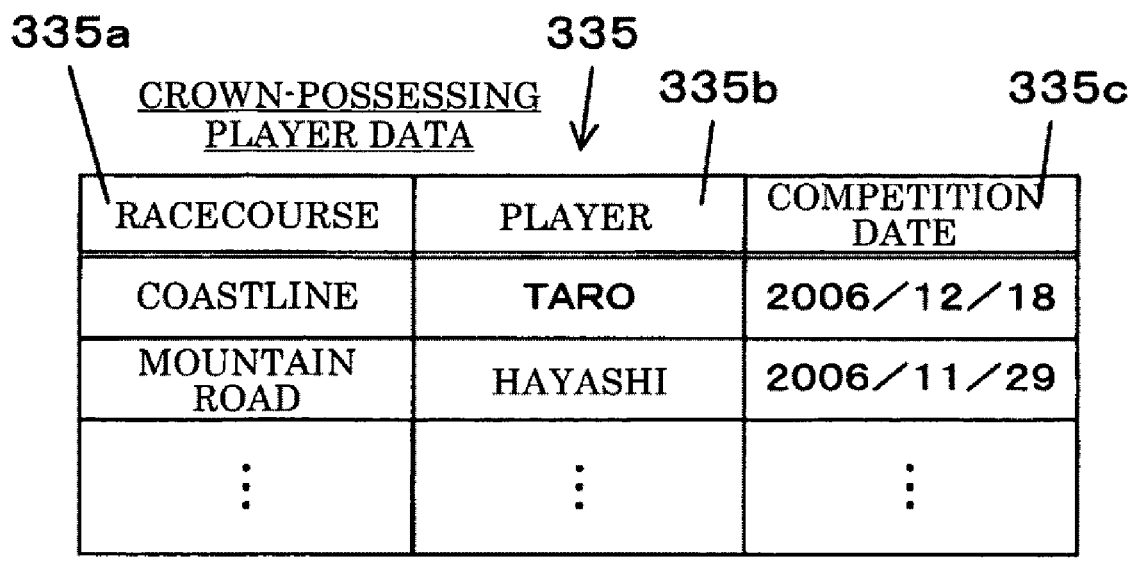
FIG. 16 shows a data configuration example of crown-possessing player data.

FIG. 16 is a view showing an example of the data configuration of the crown-possessing player data. As shown in FIG. 16, a player 335b possessing the crown of the racecourse and a date 335c when the player acquired the crown are stored as the crown-possessing player data 335 for each racecourse 335a while being associated with each other.

Figure 17:
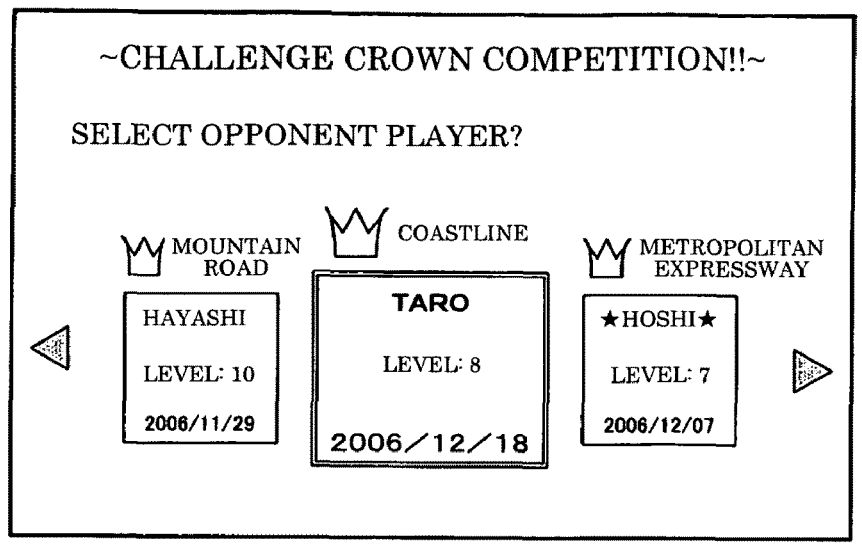
FIG. 17 shows an example of an opponent player selection screen.

FIG. 17 is a view showing an example of the opponent player selection screen. As shown in FIG. 17, the name of the racecourse and the player possessing the crown (crown-possessing player) are displayed in the opponent player selection screen for each racecourse together with information such as the player name, the level, and the crown acquisition date. The player possessing the crown and currently participating in a crown competition using another game device 10 is displayed to be unselectable with a message indicating that the player cannot be selected because the player is playing a match with another player, for example. A specific number (three in FIG. 17) of players among the players possessing the crown are displayed, and the remaining players are displayed by scrolling the screen in the lateral direction. The player can select the racecourse and the opponent player for a crown competition by selecting one of the displayed players.

When the player has selected one of the players using the player selection screen, the game calculation section 210 determines the selected player to be the opponent player and determines the racecourse associated with the player to be the match racecourse. A match (crown competition) between the player and the opponent player is carried out on the match racecourse under control of the match control section 211.

The match control section 211 controls a match (ghost match) between the player and the opponent player on the match racecourse. Specifically, the match control section 211 sets the racecourse RC (match racecourse) in a game space, and disposes the player's car PC, the ghost car GC, and the other car AC at the start line. The data relating to the racecourse RC has been stored as racecourse data 321, and the model data of the racing car has been stored as car model data 322.

The match control section 211 controls the player's car PC based on the player's instruction operation input from the operation input section 110. The match control section 211 specifies the ghost data 334d for the match racecourse as the match ghost data referring to the ghost management data 334 of the opponent player, and controls the ghost car GC and the other car AC based on the specified match ghost data. Specifically, the match control section 211 controls the ghost car GC based on the play data 334e included in the match ghost data 334d, and controls the other car AC based on the travel pattern data 323 specified by the travel pattern 334f. More specifically, the match control section 211 controls the position and the travel speed of each car so that each car moves (travels) at a specific speed along a specific travel path.

The match control section 211 subjects the player's car PC, the ghost car GC, and the other car AC to a hit check (collision determination), and changes the position of each car based on the hit check results. When the ghost car GC or the other car AC deviates from the specific travel path due to collision (contact), the match control section 211 controls the movement (travel) of the ghost car GC or the other car AC so that the ghost car GC or the other car AC gradually returns to the specific travel path.

The match control section 211 controls the speeds of the ghost car GC and the other car AC depending on the match mode. In the crown competition mode, the match control section 211 determines the speed Vg of the ghost car GC to be a speed Vg0 defined by the play data 334e, and determines the speed Va of the other car AC to be a speed Va0 defined by the travel pattern data 323.

When the match mode is the normal match mode, the match control section 211 determines the speed Vg of the ghost car GC based on the following equation (1a), and determines the speed Va of the other car AC based on the following equation (1b).

$$Vg = Vg0 \times Kt \times Kr \tag{1a}$$

$$Va = Va0 \times Kt \times Kr \tag{1b}$$

Vg0 in the equation (1a) is the speed of the ghost car GC determined by the play data 334e. Kt is an elapsed time coefficient, and Kr is a rubber band coefficient. Va0 in the equation (1b) is the speed of the other car AC determined by the travel pattern data 323.

The elapsed time coefficient Kt is a parameter for expressing deterioration (decrease in speed) of the ghost data 334d with the passage of time, and is determined based on the elapsed time T from the update date of the match ghost data 334d to the present date (match start date). The value of the elapsed time coefficient Kt is specified by "$0.0 < Kt \leq 11.0$".

Figure 18:
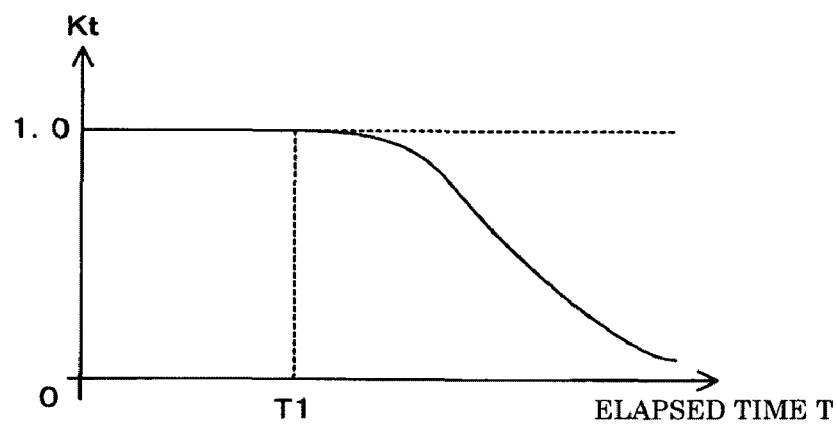
FIG. 18 shows an example of an elapsed time coefficient Kt.

FIG. 18 is a view showing an example of the relationship between the elapsed time T and the elapsed time coefficient Kt. FIG. 18 shows a graph in which the horizontal axis indicates the elapsed time T and the vertical axis indicates the elapsed time coefficient Kt. As shown in FIG. 18, the elapsed time coefficient Kt is constant (1.0) when the elapsed time T is equal to or less than a specific elapsed time T1, and gradually decreases as the elapsed time T increases. This allows a state to be expressed in which the travel speeds of the ghost car GC and the other car AC decrease as the match ghost data 334d becomes older.

Figure 19A:
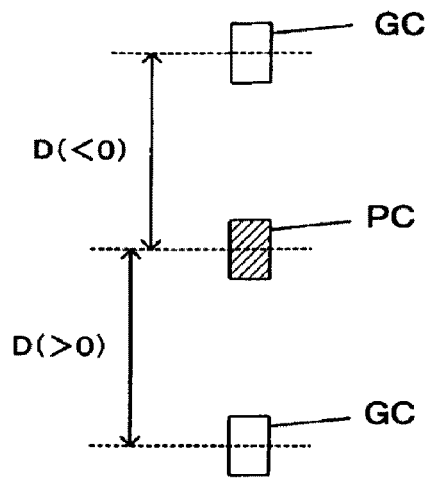
FIG. 19A and FIG. 19B show an example of a rubber band coefficient Kr.

The rubber band coefficient Kr is a parameter for expressing an effect of a virtual rubber (rubber band) which controls the ghost car GC and the other car AC so that the ghost car GC and the other car AC do not move away from the player's car PC to a large extent. The value of the rubber band coefficient Kr is specified by "$0.0 < Kr \leq 2.0$". The distance D is a positive or negative value depending on the positional relationship between the player's car PC and the ghost car GC. As shown in FIG. 19A, the distance D is a positive value when the player's car PC is positioned ahead of the ghost car GC in the travel direction, and is a negative value when the player's car PC is positioned behind the ghost car GC in the travel direction.

Figure 19B:
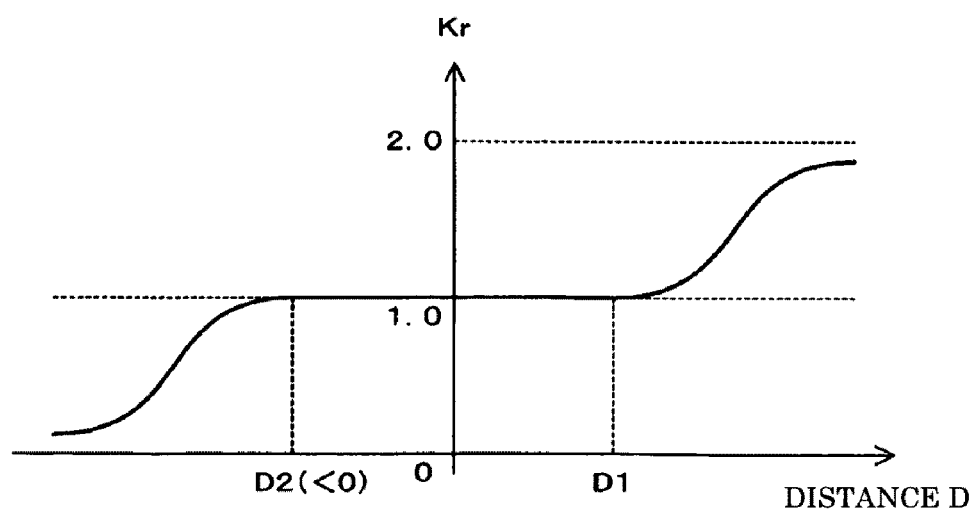

FIG. 19B is a view showing an example of the relationship between the distance D and the rubber band coefficient Kr. FIG. 19B shows a graph in which the horizontal axis indicates the distance D and the vertical axis indicates the rubber band coefficient Kr. As shown in FIG. 19B, when the distance D is a positive value (i.e., when the ghost car GC is positioned ahead of the player's car PC), the rubber band coefficient Kr is constant (1.0) when the distance D is equal to or shorter than a specific distance D1, and gradually increases as the distance D increases after exceeding the distance D1. On the other hand, when the distance D is a negative value (i.e., when the ghost car GC is positioned behind the player's car PC), the rubber band coefficient Kr is constant (1.0) when the distance D is equal to or longer than a specific distance D2 (<0), and gradually decreases as the distance D decreases in the range in which the distance D is less than the distance D2.

The graphs for determining the elapsed time coefficient Kt and the rubber band coefficient Kr are stored as coefficient setting data 324 in the form of a function formula and a data table indicating the graphs.

The match control section 211 repeatedly controls each car until the player's car PC and the ghost car GC reach a specific finish line defined on the racecourse RC. The match control section 211 stops controlling the travel state of each car when the player's car PC and the ghost car GC have reached the finish line, and determines that the car which has reached the finish line earlier than the other has won the match.

Figure 20:
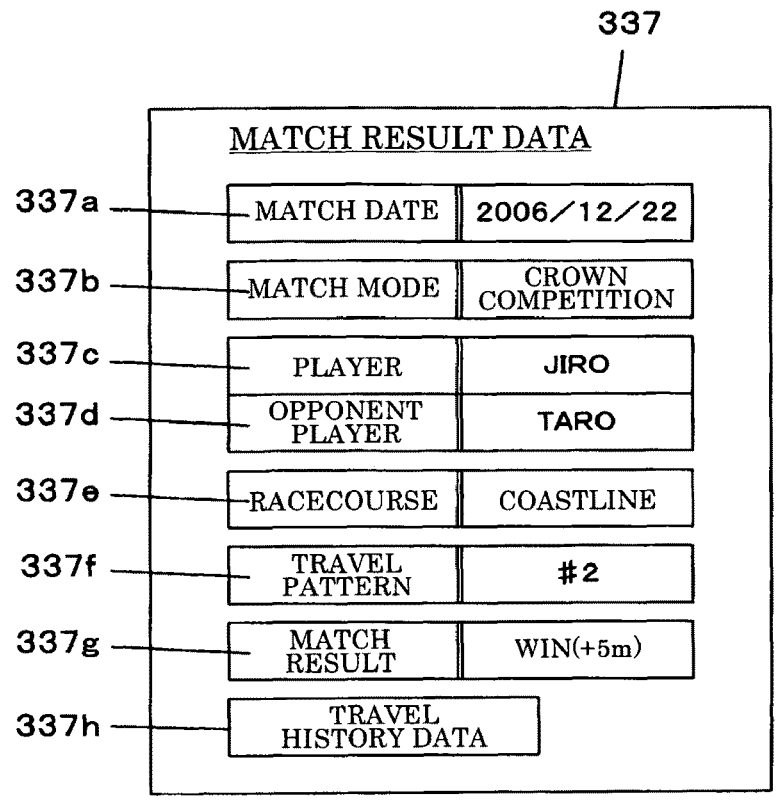
FIG. 20 shows a data configuration example of match result data.

The data relating to the match performed under control of the match control section 211 is stored as match result data 337. FIG. 20 is a view showing an example of the data configuration of the match result data 337. As shown in FIG. 20, a match date 337a, a match mode 337b, a player 337c, an opponent player 337d, a match racecourse 337e, a travel pattern 335f of the other car, a match result 335g, and a travel history data 337h are stored as the match result data 337. The travel history data 337h is data relating to the travel history of the player's car PC. Specifically, the travel history data 337h is data relating to the position, the travel speed, the posture, and the like of the player's car PC at each control point Q defined on the racecourse RC in the same manner as the play data 334e.

In FIG. 8, the data management section 220 manages data used by the game calculation section 210. Specifically, when the ghost match controlled by the match control section 211 has completed, the data management section 220 updates the corresponding data based on the generated match result data 337. Specifically, the data management section 220 updates the match racecourse ghost data 334d of the ghost management data 334 of the player using the travel history data 337h as the play data 334e. When the match mode is the crown competition mode, the data management section 220 cancels the crown competition state of the match racecourse to update the crown competition state data 336. When the player has won the match, the data management section 220 transfers the crown of the opponent player to the player to update the crown-possessing player data 335, and updates the possessed crown data 332e of the player management data 332 of each of the player and the opponent player. The data management section 220 distributes the generated match result data 337 to other game devices 10.

When the data management section 220 has received the match result data 337 distributed from another game device 10, the data management section 220 similarly updates the corresponding data based on the received match result data 337.

The image generation section 230 generates a game image for displaying a game screen based on the calculation results of the game calculation section 210, and outputs an image signal of the generated image to the image display section 130. The image display section 130 displays the game screen based on the image signal from the image generation section 230 while redrawing the screen of one frame at specific unit time intervals (e.g., every 1/60 second). The function of the image display section 130 is implemented by hardware such as a CRT, an LCD, an ELD, a PDP, or an HMD. In FIG. 2, the display 1102 corresponds to the image display section 130.

The sound generation section 240 generates game sound such as effect sound and BGM used during the game, and outputs a sound signal of the generated game sound to the sound output section 140. The sound output section 140 outputs the game sound such as effect sound and BGM based on the sound signal from the sound generation section 240. The function of the sound output section 140 is implemented by a speaker or the like. In FIG. 2, the speaker 1104 corresponds to the sound output section 140.

The communication section 150 connects with the communication line N1 based on the control signal from the processing section 200, and communicates data with an external device. The function of the communication section 150 is implemented by a wireless communication module, a jack for a communication cable, a control circuit, or the like. In FIG. 2, the communication device 1118 corresponds to the communication section 150.

The storage section 300 stores a system program for implementing each function for causing the processing section 200 to integrally control the game device 10, a program and data necessary for causing the processing section 200 to execute the game, and the like. The storage section 300 is used as a work area for the processing section 200, and temporarily stores the results of calculations performed by the processing section 200 based on various programs, data input from the operation input section 110, and the like. The function of the storage section 300 is implemented by an IC memory, a hard disk, a CD-ROM, a DVD, an MO, a RAM, a VRAM, or the like. In FIG. 2, the IC memory mounted on the control unit 1120 corresponds to the storage section 300.

In this embodiment, the storage section 300 stores an overall program 310 including a game program 311 for causing the processing section 200 to function as the game calculation section 210 and a data management program 312 for causing the processing section 200 to function as the data management section 220, and stores the racecourse data 321, the car model data 322, the travel pattern data 323, the coefficient setting data 324, the player management DB 331, the ghost management DB 333, the crown-possessing player data 335, the crown competition state data 336, and the match result data 335.

Process Flow

Figure 21:
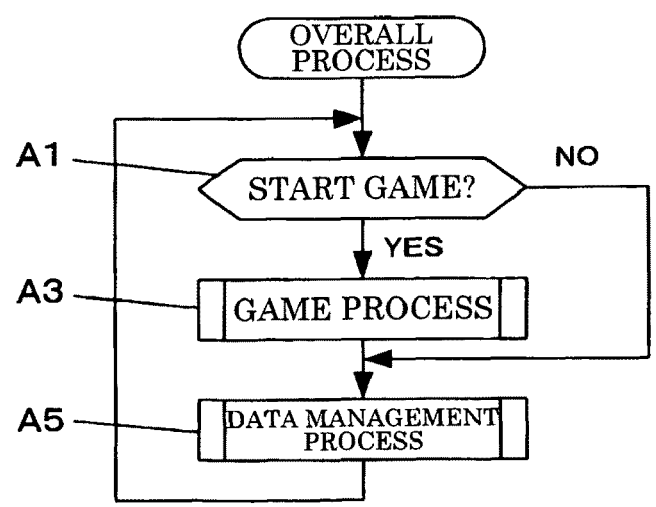
FIG. 21 is a flowchart showing an overall process.

FIG. 21 is a flowchart illustrative of the flow of the overall process of the game device 10. This process is implemented by causing the processing section 200 to execute a process based on the overall program 310. As shown in FIG. 20, when the processing section 200 has been determined to start the game in response to insertion of a specific number of coins or the like (step A1: YES), the game calculation section 210 performs the game process (step A3).

Figure 22:
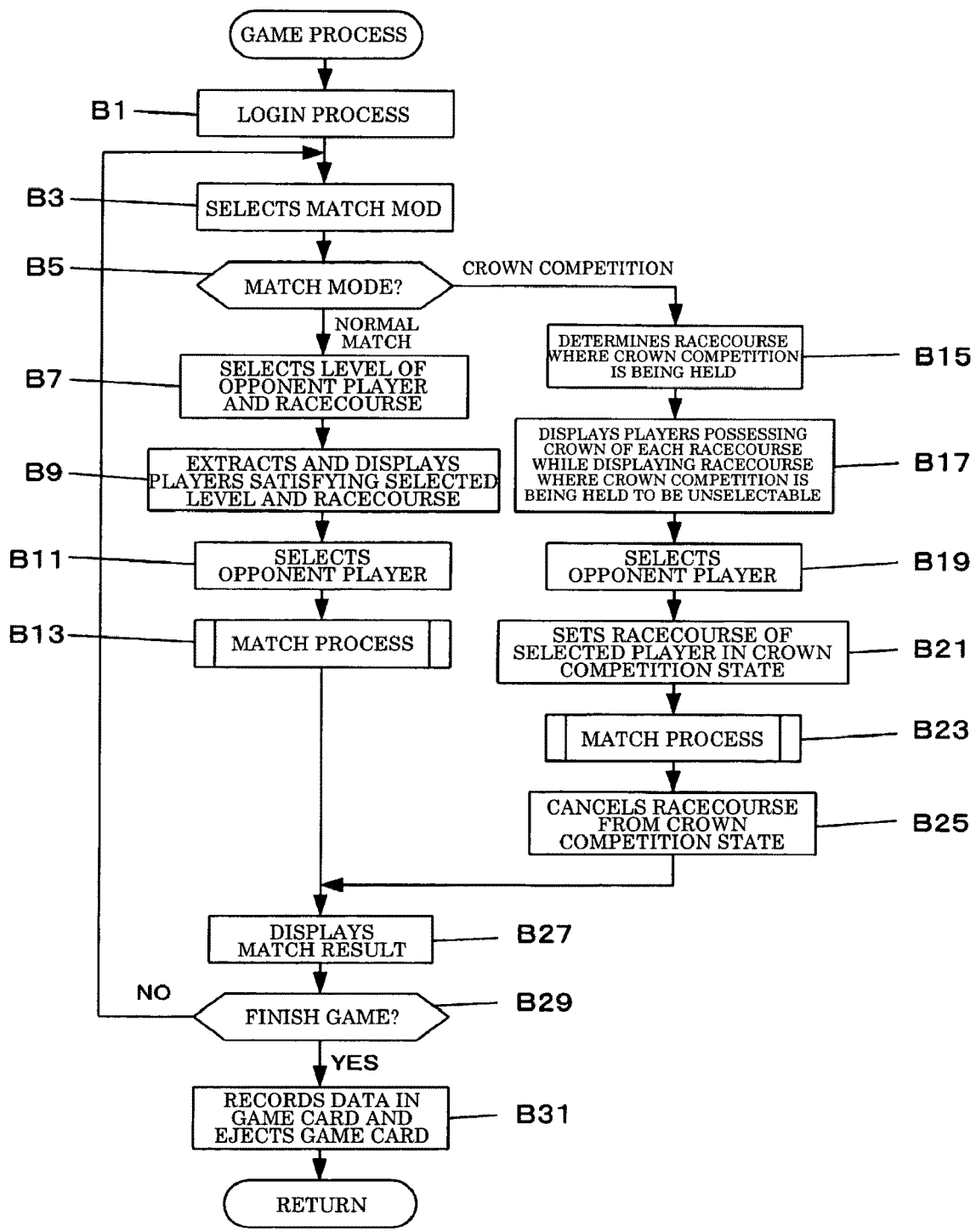
FIG. 22 is a flowchart showing a game process performed during the overall process.

FIG. 22 is a flowchart illustrative of the flow of the game process. As shown in FIG. 22, the game calculation section 210 performs a specific login process to specify the player. Specifically, the game calculation section 210 specifies the player referring to the player management DB 331 based on the data read from the inserted game card 20 and input from the card read/write section 120 (step B1). The game calculation section 210 then causes the image display section 130 to display the match mode selection screen (see FIG. 10) for selecting the match mode, and selects the match mode based on the player's selection operation input from the operation input section 110 (step B3).

When the selected match mode is the normal match mode (step B5: "normal"), the game calculation section 210 selects the level of the opponent player and the racecourse based on the player's selection operation input from the operation input section 110 (step B7). The game calculation section 210 then extracts the players satisfying the selected level and racecourse referring to the player management DB 331 and the ghost management DB 333, and causes the image display section 130 to display the extracted players as opponent candidates (step B9). The game calculation section 210 selects one of the players displayed in the list based on the player's selection operation input from the operation input section 110, determines the selected player to be the opponent player, and determines the racetrack selected in advance to be the match racetrack (step B11). The match control section 211 then performs the match process for allowing the player to play a match against the opponent player on the match racecourse (step B13).

Figure 23:
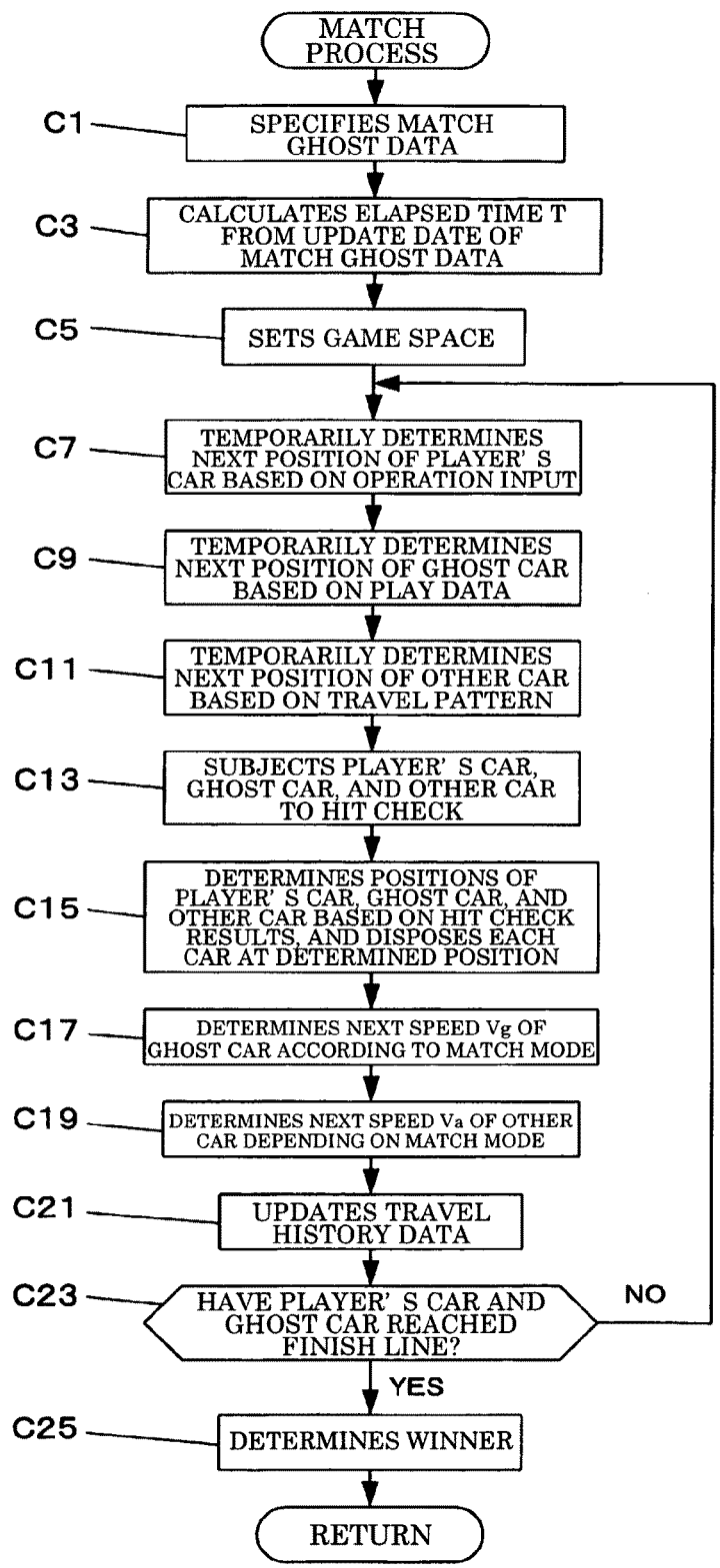
FIG. 23 is a flowchart showing a match process performed during the game process.

FIG. 23 is a flowchart illustrative of the flow of the match process. As shown in FIG. 23, the match control section 211 refers to the ghost management DB 333, and specifies the ghost data of the opponent player for the match racecourse as the present match ghost data 334*d* (step C1). The match control section 211 calculates the elapsed time T from the update date of the match ghost data 334*d* to the present date, and calculates the elapsed time coefficient Kt based on the calculated elapsed time T referring to the coefficient setting data 324 (step C3). The match control section 211 sets the racecourse RC (match racecourse) in the game space, and disposes the player's car PC, the ghost car GC, and the other car AC at the start line (step C5).

The match control section 211 then starts to control each car. Specifically, the match control section 211 temporarily determines the next position of the player's car PC based on the player's instruction operation input from the operation input section 110 (step C7). The match control section 211 temporarily determines the next position of the ghost car GC based on the play data 334*e* included in the match ghost data 334*d* (step C9), and temporarily determines the next position of the other car AC based on the travel pattern data 323 specified by the ghost data 334*d* (step C11). The match control section 211 then subjects the player's car PC, the ghost car GC, and the other car AC to a hit check (collision determination) (step C13), determines the position of each car based on the hit check results, and disposes each car at the determined position (step C15).

The match control section 211 then determines the next speed Vg of the ghost car GC depending on the match mode. Specifically, when the match mode is the normal match mode, the match control section 211 calculates the distance D between the ghost car GC and the player's car PC, and calculates the rubber band coefficient Kr based on the calculated distance D referring to the coefficient setting data 324. The match control section 211 determines the next speed Vg of the ghost car GC according to the equation (1a). When the match mode is the crown competition mode, the match control section 211 determines the speed Vg0 defined by the play data 334*e* to be the next speed Vg of the ghost car GC (step C17). The match control section 211 similarly determines the next speed Va of the other car AC depending on the match mode. Specifically, when the match mode is the normal match mode, the match control section 211 determines the next speed Va according to the equation (1b). When the match mode is the crown competition mode, the match control section 211 determines the speed Va0 defined by the travel pattern data 323 to be the next speed Va (step C19). The match control section 211 then updates the travel history data 337*h* by adding the position, the travel speed, the posture, and the like of the player's car PC (step C21).

The match control section 211 then determines whether or not the player's car PC and the ghost car GC have reached the finish line defined on the racetrack RC. When the match control section 211 has determined that the player's car PC and the ghost car GC have not reached the finish line (step 23: NO), the match control section 211 returns to the step C7. When the match control section 211 has determined that the player's car PC and the ghost car GC have reached the finish line (step 23: YES), the match control section 211 determines that the player's car PC or the ghost car GC which has reached the finish line earlier than the other is the winner (step C25). When the above process has been completed, the match control section 211 finishes the match process.

The game calculation section 210 then causes the image display section 130 to display the match results (e.g., winner and loser) (step B27).

When the match mode selected in the step B5 is the crown competition mode (step B5: "crown competition"), the game calculation section 210 determines the racecourse where a crown competition is being held referring to the crown competition state data 336 (step B15). The game calculation section 210 then refers to the crown-possessing player data 335 and causes the image display section 130 to display the opponent player selection screen (see FIG. 17) in which the players possessing the crown of each racecourse are listed while displaying the player of the racecourse where a crown competition is being held to be unselectable (step B17). The game calculation section 210 selects one of the listed players displayed in the list based on the player's selection operation input from the operation input section 110, determines the selected player to be the opponent player, and determines the racetrack associated with the selected player in the crown-possessing player data 335 to be the match racetrack (step B19). The game calculation section 210 updates the crown competition state data 336 by setting the racecourse of the selected player to be in a crown competition state (step B21). The match control section 211 then performs the match process for allowing the player to play a match against the opponent player on the match racecourse (see FIG. 23) (step B23).

After completion of the match process, the game calculation section 210 cancels the match racecourse from the crown competition state (step B25). The game calculation section 210 then causes the image display section 130 to display the match results (e.g., winner and loser, and a message indicating that the player has acquired the crown from the opponent player when the player has won the match) (step B27).

The game calculation section 210 then determines whether or not to finish the game. When the game calculation section 210 has determined to continue the game (step B29: NO), the game calculation section 210 returns to the step B3. When the game calculation section 210 has determined to finish the game (step B29: YES), the game calculation section 210 causes the card read/write section 120 to record data such as the match record in the game card 20 and eject the game card 20 (step B31). When the game calculation section 210 has completed the above process, the game calculation section 210 finishes the game process.

When the game process has been completed, the data management section 220 performs a data management process (step A5).

Figure 24:
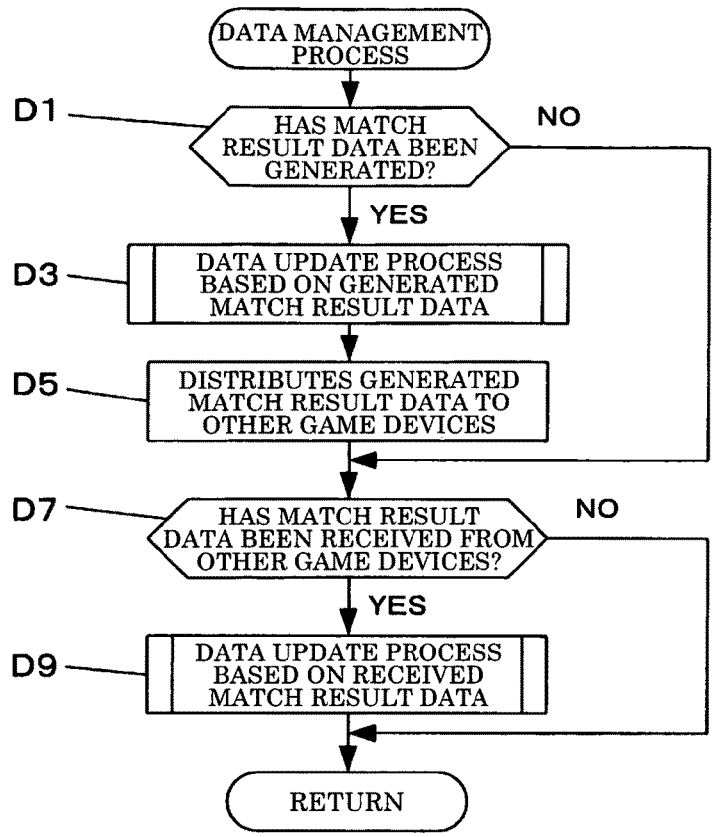
FIG. 24 is a flowchart showing a data management process performed during the overall process.

FIG. 24 is a flowchart illustrative of the flow of the data management process. As shown in FIG. 24, when new match result data 337 has been generated as a result of the match control of the match control section 211 (step D1: YES), the data management section 220 performs a data update process based on the generated match result data 337 (step D3).

Figure 25:
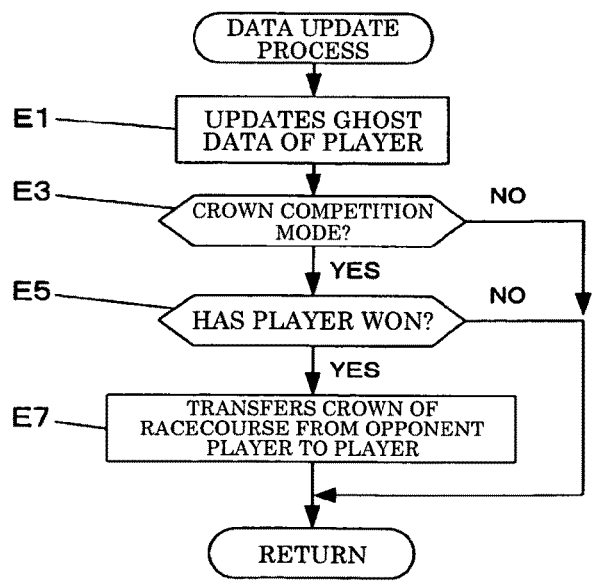
FIG. 25 is a flowchart showing a data update process performed during the data management process.

FIG. 25 is a flowchart illustrative of the flow of the data update process. As shown in FIG. 25, the data management section 220 updates the match racetrack ghost data 334d of the player management data 332 of the player using the travel history data 337h included in the processing target match result data 337 as the play data 334e (step E1). When the match mode is the crown competition mode (step E3: YES) and the player has won the match (step E5: YES), the data management section 220 transfers the crown of the match racecourse to the player from the opponent player to update the crown-possessing player data 335, and updates the possessed crown data 332e of the player management data 332 of the player. When the data management section 220 has completed the above process, the data management section 220 finishes the data update process.

The data management section 220 then distributes the match result data 337 to other game devices 10 (step D5).

When the data management section 220 has received the match result data 337 distributed from another game device 10 (step D7: YES), the data management section 220 performs the data update process (see FIG. 25) based on the received match result data 337 (step D9). When the data management section 220 has completed the above process, the data management section 220 finishes the data management process. After completion of the data management process, the process in the step A1 is repeated.

Second Embodiment

A second embodiment is described below. In the following description, the same elements as in the first embodiment are indicated by the same symbols. Detailed description of these elements is appropriately omitted.

System Configuration

Figure 26:
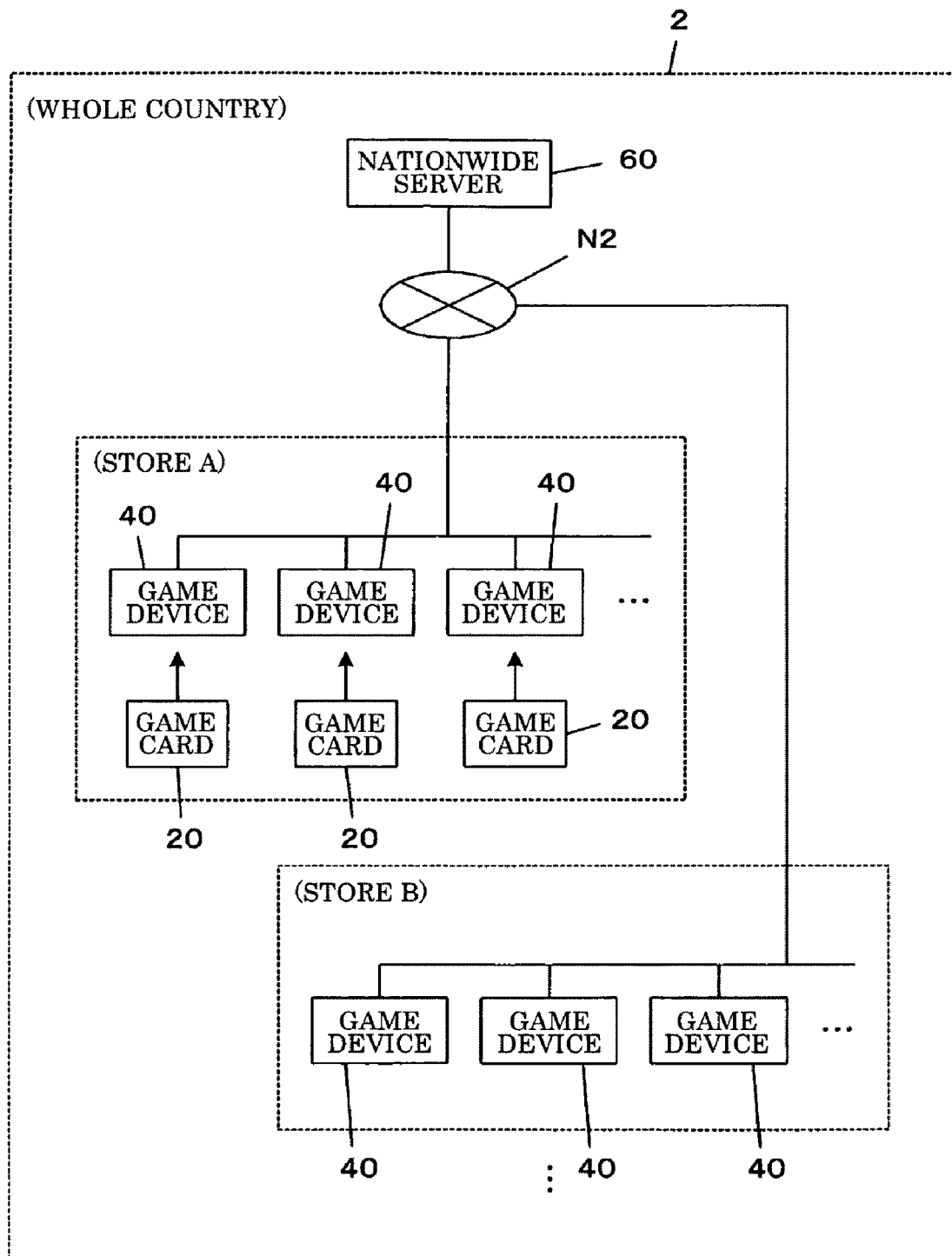
FIG. 26 is a view showing the configuration of a game system according to a second embodiment.

FIG. 26 is a view showing the configuration of a game system 2 according to the second embodiment. As shown in FIG. 26, the game system 2 is configured by connecting a nationwide server 60 and game devices installed in respective stores with a communication line N2. The communication line N2 refers to a communication channel through which data can be transferred. Specifically, the communication channel N2 includes a communication network such as a LAN using a private line (private cable) for direct connection, Ethernet (registered trademark), and the like, a telecommunication network, a cable network, and the Internet. The communication method may be a cable communication method or a wireless communication method.

The nationwide server 60 is a server system including a known server computer, and is installed on the game manufacturer side, for example. The nationwide server 60 integrally controls the game system 2. Specifically, the nationwide server 60 manages various types of data used in each game device 40. The nationwide server 60 may be a server system including two or more server computers. The game device 40 is a game device for a player to play a game. The game device 40 is implemented by the game device 10 according to the first embodiment shown in FIG. 2, for example.

Principle

In the second embodiment, one player possesses a crown in racecourse units over the whole country including all the stores. One player in each store possesses the right to challenge the crown (challenge right) in racecourse units.

Figure 27:
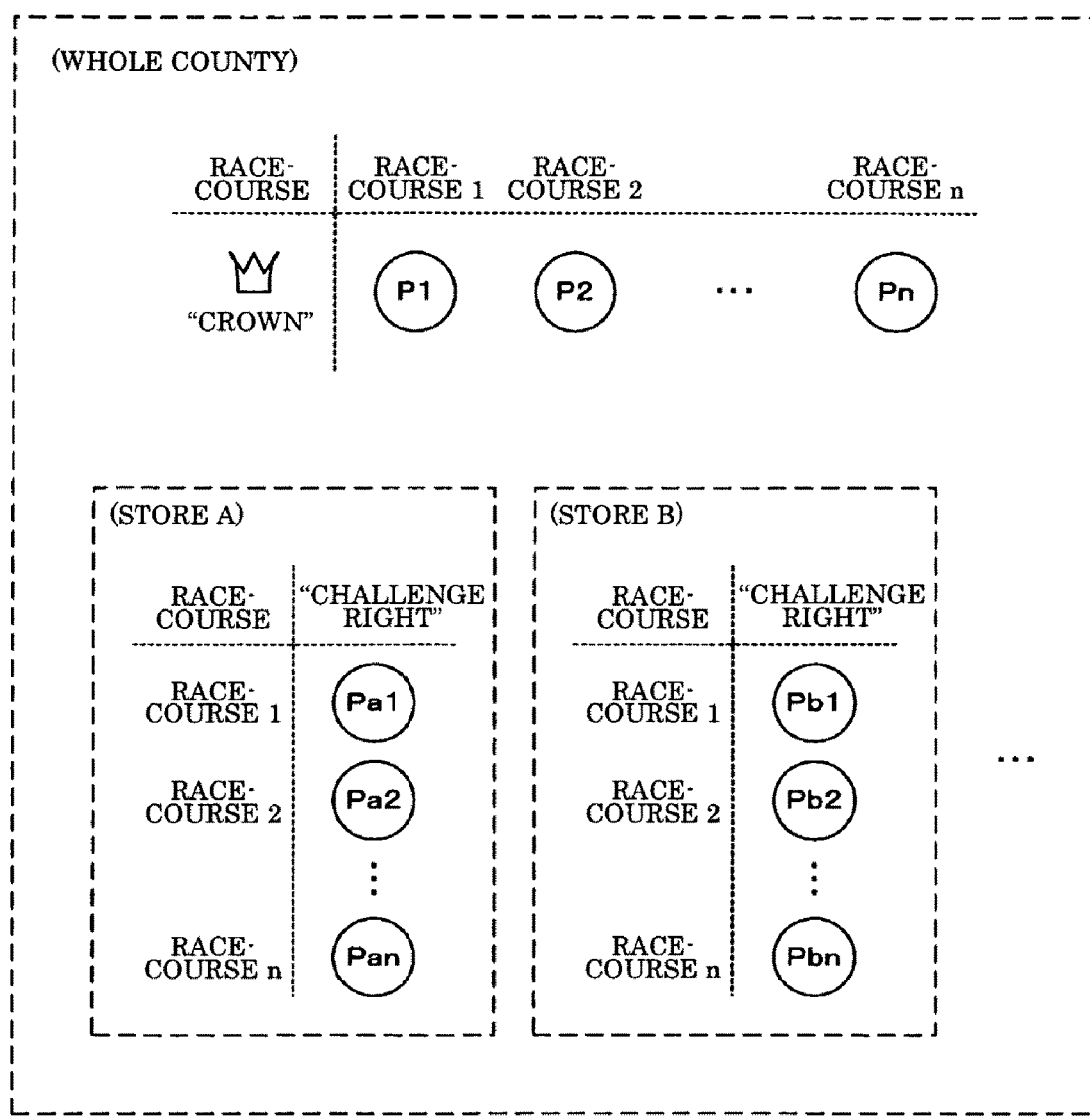
FIG. 27 is a view illustrative of the possession of a crown.

FIG. 27 is a view showing an example of the possession of the crown and the challenge right. As shown in FIG. 27, when n racecourses RC from a racecourse 1 to a racecourse n are provided in total, n crowns exist in total, and n challenge rights for the respective racecourses exist in store units. A player necessarily belongs to one store, and can possess only the challenge right given to the store to which the player belongs (player's store). The store to which the player belongs is recorded in a game card 20 possessed by the player.

Figure 28:
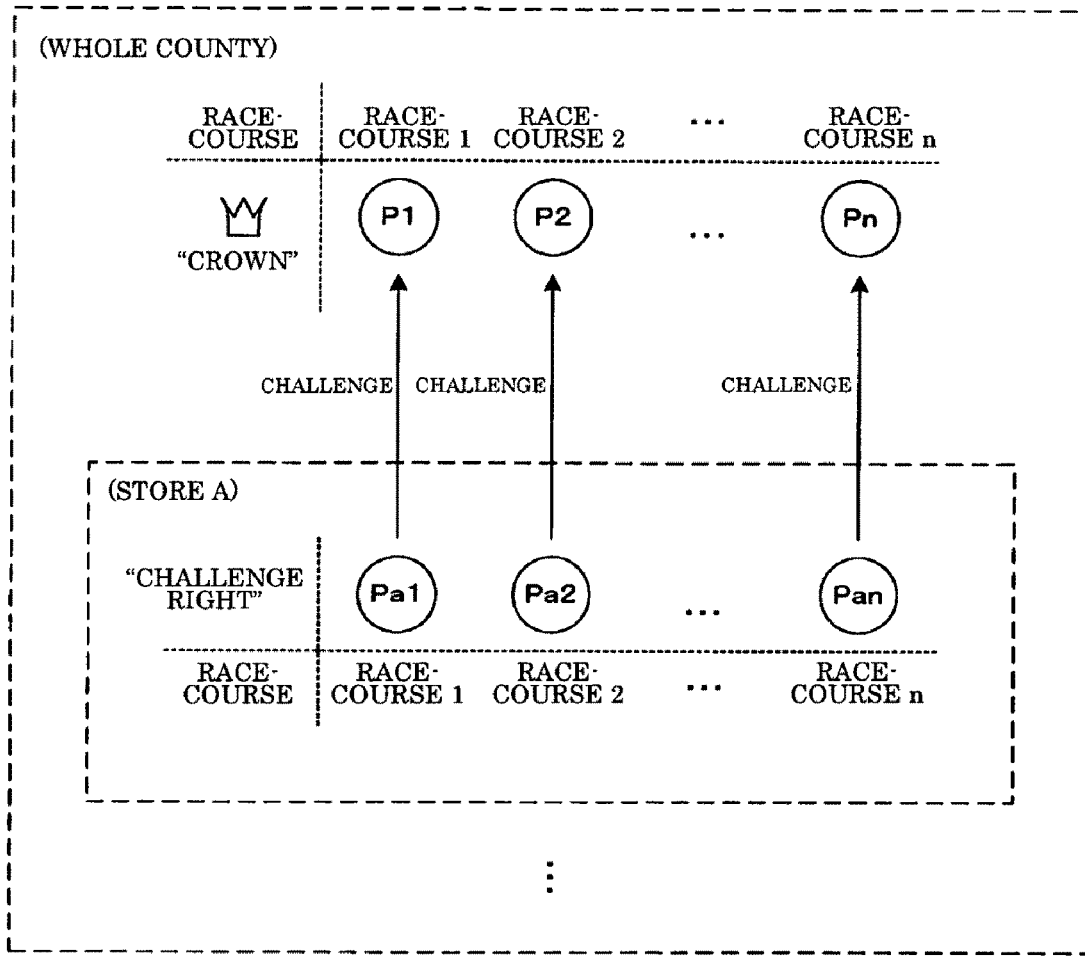
FIG. 28 is a view illustrative of a crown competition.

Only the player possessing the challenge right in each store (challenge right-possessing player) can play a crown competition in which the player plays a match against the player possessing the crown (crown-possessing player) aiming to acquire the crown. FIG. 28 is a view showing an example of the crown competition. As shown in FIG. 27, in a store A, a player Pa1 possessing the challenge right of the racecourse 1 can challenge the crown competition of the racecourse 1, and a player Pa2 possessing the challenge right of the racecourse 2 can challenge the crown competition of the racecourse 2. This also applies to the racecourse 3 to the racecourse n.

Specifically, the player must acquire the challenge right of the racecourse for which the player desires to acquire the crown in the player's store. The player may acquire the challenge right as follows. Specifically, the player plays a challenge right acquisition match against the player possessing the challenge right (challenge right-possessing player) in the player's store aiming to acquire the challenge right, and can acquire the challenge right from the challenge right-possessing player when the player has won the challenge right competition.

Figure 29A:
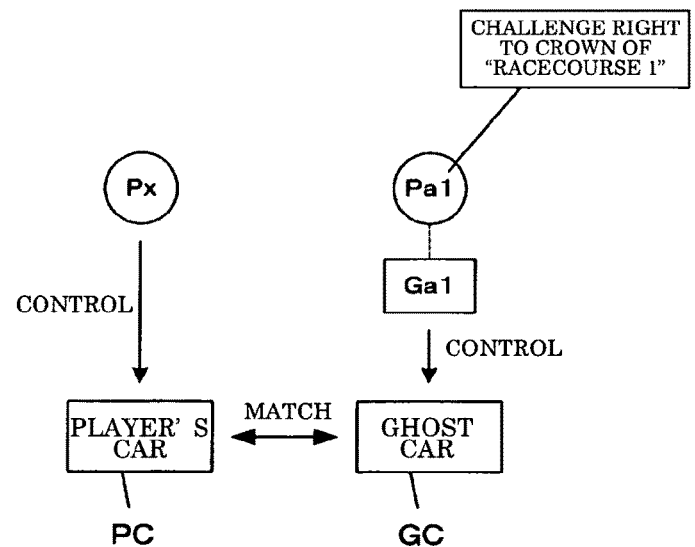
FIG. 29A and FIG. 29B are other views illustrative of a crown competition.
Figure 29B:
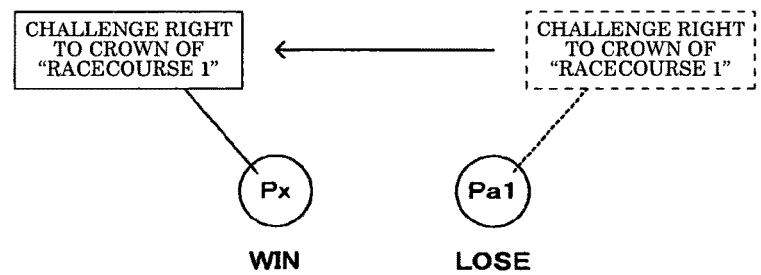

FIG. 29A and FIG. 29B show an example of the challenge right competition. FIG. 29A and FIG. 29B show the case where a player Px aims to acquire the challenge right of the racecourse 1. In this case, the player Px plays a match against the player Pa1 who is the player possessing the challenge right (challenge right-possessing player) of the racecourse 1 in the store A, as shown in FIG. 29A. Specifically, the player's car PC is controlled based on the operation of the player Px, and the ghost car GC is controlled based on the ghost data Ga1 of the player Pa1 for the racecourse 1. As shown in FIG. 29B, when the player Px has won the match (WIN), the challenge right of the racecourse 1 possessed by the player Pa1 is transferred to the player Px. Specifically, the player Px has acquired the challenge right of the racecourse 1 from the player Pa1. When the player Px has lost the match, the player Px fails to acquire the challenge right. Therefore, the player possessing the challenge right of the racecourse 1 remains unchanged.

Functional Configuration

Figure 30:
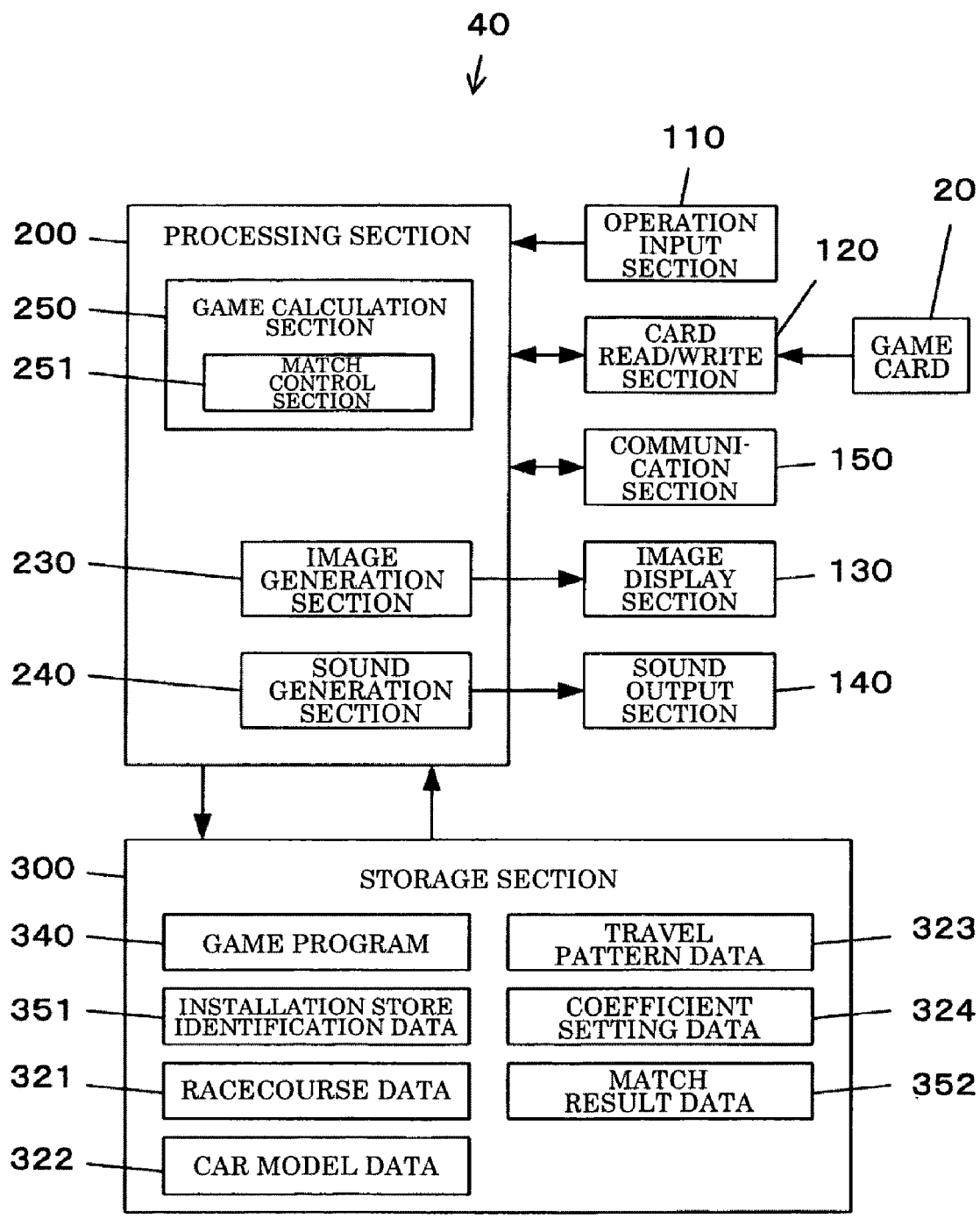
FIG. 30 is a functional configuration diagram of a game device.

FIG. 30 is a block diagram showing the functional configuration of the game device 40. As shown in FIG. 30, the game device 40 is configured to include an operation input section 110, a card read/write section 120, a processing section 200, an image display section 130, a sound output section 140, a communication section 150, and a storage section 300.

In this embodiment, the processing section 200 includes a game calculation section 250 which mainly performs game calculations, an image generation section 230 which generates a game image such as a game screen, and a sound generation section 240 which generates game sound such as effect sound and background music (BGM).

The game calculation section 250 includes a match control section 251, and controls execution of the car racing game. Specifically, when the data read from the inserted game card 20 is input from the card read/write section 120, the game calculation section 250 specifies the player based on the input data. The game calculation section 250 determines whether or not the player's store read from the game card 20 coincides with the store in which the game device 40 is installed (installation store). When the player's store does not coincide with the installation store, the game calculation section 250 causes the image display section 130 to display a message indicating that the player cannot play the game in that store, and causes the game card 20 to be ejected. The data indicating the installation store is stored as installation store identification data 351.

The game calculation section 250 then causes the image display section 130 to display a match mode selection screen for selecting the match mode. FIG. 31 is a view showing an example of the match mode selection screen. As shown in FIG. 31, a normal match mode and a crown competition mode are displayed in the match mode selection screen as the match modes. The normal match mode is a mode in which the player plays a normal match against another player in the store or over the whole country, and the crown competition mode is a mode in which the player plays a crown competition.

When the player has selected the normal match mode using the match mode selection screen, the game calculation section 250 causes the image display section 130 to display a selection screen (not shown) for selecting the desired level of the opponent player and the desired racecourse. When the player has selected the level and the racecourse, the game calculation section 250 requests the nationwide server 60 to transmit a list of the players satisfying the selected level and racecourse while transmitting the name of the store. The game calculation section 250 receives the list of the players transmitted from the nationwide server 60 in response to the request, and causes the image display section 130 to display a player selection screen (not shown) in which the listed players are displayed as opponent candidates. When the player has selected one of the players using the player selection screen, the game calculation section 250 determines the selected player to be the opponent player and determines the racecourse selected in advance to be the match racecourse. A match between the player and the opponent player is carried out on the match racecourse under control of the match control section 211.

Figure 32:
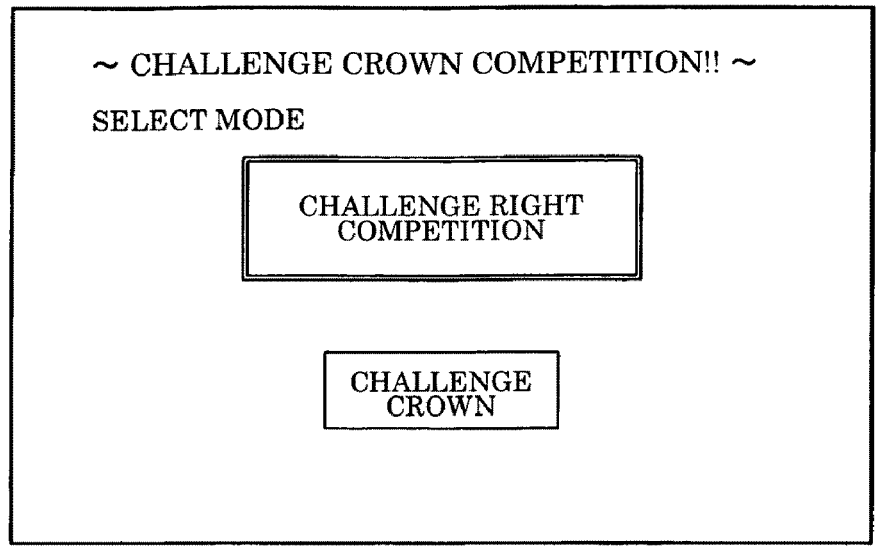
FIG. 32 shows an example of a challenge mode selection screen.

When the player has selected the crown competition mode using the match mode selection screen, the game calculation section 250 causes the image display section 130 to display a challenge mode selection screen for selecting a challenge mode. FIG. 32 is a view showing an example of the challenge mode selection screen. As shown in FIG. 32, a challenge right mode and a crown challenge mode are displayed in the challenge mode selection screen as the challenge modes. The challenge right mode is a mode in which the player attempts to acquire the challenge right of each racecourse in the player's store, and the crown challenge mode is a mode in which the player challenges the crown competition.

When the player has selected the challenge right mode using the challenge mode selection screen, the game calculation section 250 requests the nationwide server 60 to transmit challenge right competition state data 734 and challenge right-possessing player data 733 of the installation store (challenge right competition request), and receives data (challenge right competition data) transmitted from the nationwide server 60 in response to the request. The game calculation section 250 then refers to the received challenge right competition state data 734, and determines the racecourse on which a match (challenge right competition) against the player possessing the challenge right is currently performed using another game device 40 in the installation store. The game calculation section 210 refers to the received challenge right-possessing player data 733, and causes the image display section 130 to display a challenge right player selection screen in which the challenge right-possessing players of the respective racecourses in the installation store are listed. In this case, the player of the racecourse during the challenge right competition is displayed to be unselectable.

Figure 33:
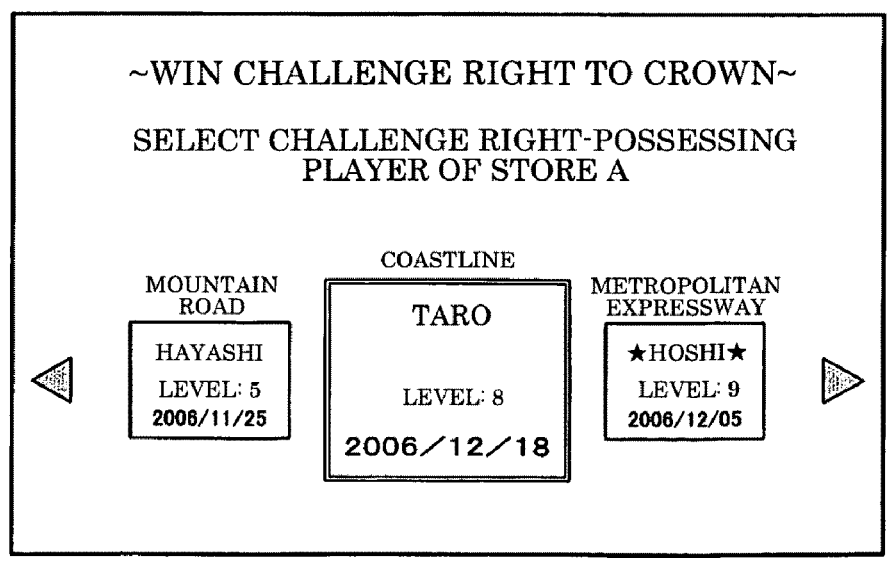
FIG. 33 shows an example of a challenge right player selection screen.

FIG. 33 is a view showing an example of the challenge right player selection screen. As shown in FIG. 33, the name of the player possessing the challenge right (challenge right-possessing player) in the installation store is displayed in the challenge right player selection screen for each racecourse together with the level and the challenge right acquisition date. The player possessing the challenge right and currently participating in a challenge right competition using another game device 10 in the installation store is displayed to be unselectable with a message indicating that the player is playing a match with another player, for example. A specific number (three in FIG. 33) of players among the players possessing the challenge right in the installation store are displayed, and the remaining players are displayed by scrolling the screen in the lateral direction. The player can select the racecourse and the opponent player for a challenge right competition by selecting one of the players.

When the player has selected one of the players using the challenge right player selection screen, the game calculation section 250 determines the selected player to be the opponent player and determines the racecourse associated with that player to be the match racecourse. A match (challenge right competition) between the player and the opponent player is carried out on the match racecourse under control of the match control section 251.

When the player has selected the crown challenge mode using the challenge mode selection screen, the game calculation section 250 requests the nationwide server 60 to transmit crown-possessing player data 731, crown competition state data 732, and player's challenge right data 722*j* (crown competition request) while transmitting the name of the player, and receives data (crown competition data) transmitted from the nationwide server 60 in response to the request. The game calculation section 250 then refers to the received crown competition state data 732, and determines the racecourse on which a match (crown competition) against the player possessing the crown is currently performed using another game device 40. The game calculation section 250 refers to the received challenge right data 722*j*, and determines the racecourse for which the player possesses the challenge right to be a racecourse for which the player can challenge the crown. The game calculation section 210 refers to the received crown-possessing player data 731, and causes the image display section 130 to display a crown competition player selection screen in which the crown-possessing players of the respective racecourses are listed. In this case, only the crown-possessing players of the racecourse for which the player possesses the challenge right and which is not currently used for a crown competition are displayed to be selectable.

Figure 34:
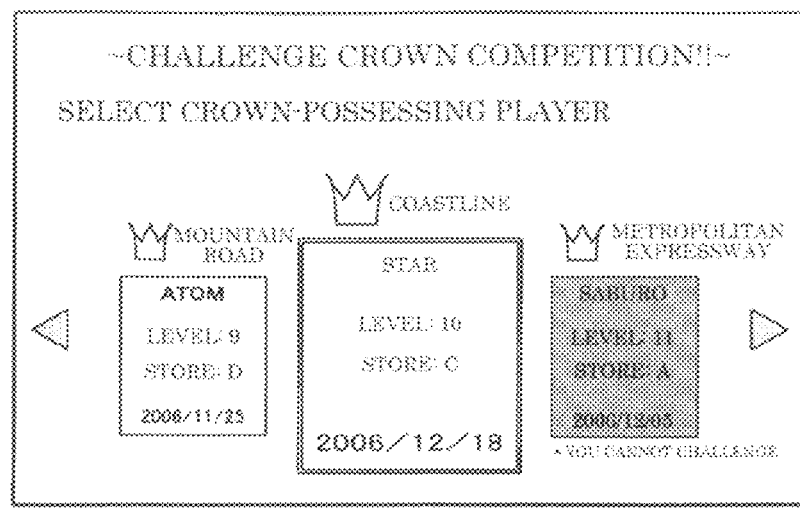
FIG. 34 shows an example of a crown competition player selection screen.

FIG. 34 is a view showing an example of the crown competition player selection screen. As shown in FIG. 34, the name of the player possessing the crown (crown-possessing player) is displayed in the crown competition player selection screen for each racecourse together with the level, the player's store, and the crown acquisition date. The crown-possessing players of the racecourse during a crown competition using another game device 10 in the installation store and the racecourse for which the player does not possess the challenge right are displayed to be unselectable with a message indicating that the crown-possessing player is playing a match with another player or the player does not possess the challenge right, for example. A specific number (three in FIG. 34) of players among the crown-possessing players are displayed, and the remaining players are displayed by scrolling the screen in the lateral direction. The player can select the racecourse and the opponent player for a crown competition by selecting one of the players.

When the player has selected one of the players using the crown competition player selection screen, the game calculation section 250 determines the selected player to be the opponent player and determines the racecourse associated with that player to be the match racecourse. A match (crown competition) between the player and the opponent player is carried out on the match racecourse under control of the match control section 251.

The match control section 251 controls a match (ghost match) between the player and the opponent player on the match racecourse. Specifically, the match control section 251 requests the nationwide server 60 to transmit the ghost data of the opponent player for the match racecourse, and receives ghost data 334*d* transmitted from the nationwide server 60 in response to the request. The match control section 251 controls the player's car PC based on the player's instruction operation input from the operation input section 110, and controls the ghost car GC and the other car AC based on the received ghost data 334*d*. The match control section 251 subjects the player's car PC, the ghost car GC, and the other car AC to a hit check (collision determination), and changes the position of each car based on the determination results.

The match control section 251 controls the speeds of the ghost car GC and the other car AC depending on the match mode. Specifically, when the match mode is the crown competition mode, the match control section 251 sets the speed Vg of the ghost car GC to be a speed Vg0 defined by the play data 334*e* included in the received ghost data 334*d*, and sets the speed Va of the other car AC to be a speed Va0 defined by the travel pattern data 323 specified by the ghost data 334*d*. When the match mode is the normal match mode, the match control section 251 determines the speed Vg of the ghost car GC based on the equation (1a), and determines the speed Va of the other car AC based on the equation (1b). The match control section 251 stops controlling the travel state of each car when the player's car PC and the ghost car GC have reached the finish line defined on the racecourse RC, and determines that the car which has reached the finish line earlier than the other has won the match.

Figure 35:
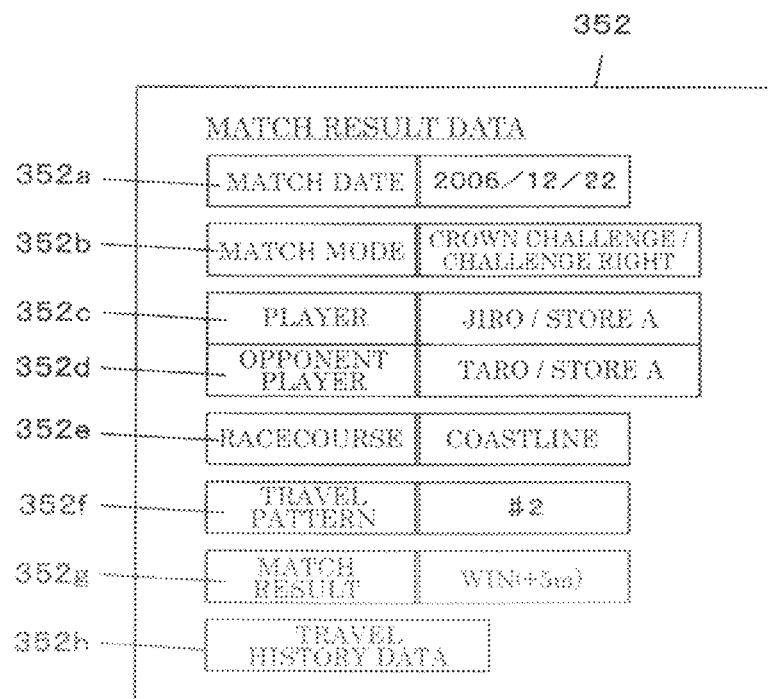
FIG. 35 shows a data configuration example of match result data.

The data relating to the match performed under control of the match control section 251 is stored as match result data 352. FIG. 35 is a view showing an example of the data configuration of the match result data 352. As shown in FIG. 35, a match date 352*a*, a match mode 352*b*, a player 352*c*, an opponent player 352*d*, a match racecourse 352*e*, a travel pattern 352*f* of the other car, a match result 352*g*, and a travel history data 352*h* are stored as the match data 352. When the match mode is the crown competition mode, the challenge mode (i.e., challenge right mode or crown challenge mode) is also stored as the match mode 352*b*. When the match mode is the normal match mode, the match area (i.e., whole country or store name) is also stored as the match mode 352*b*. The name of the player's store is also stored as the player 352*c* and the opponent player 352*d*.

In FIG. 30, the storage section 300 stores a game program 340 for causing the processing section 200 to function as the game calculation section 250 as a program, and stores the installation store identification data 351, racecourse data 321, car model data 322, travel pattern data 323, coefficient setting data 324, and match result data 352 as data.

Figure 36:
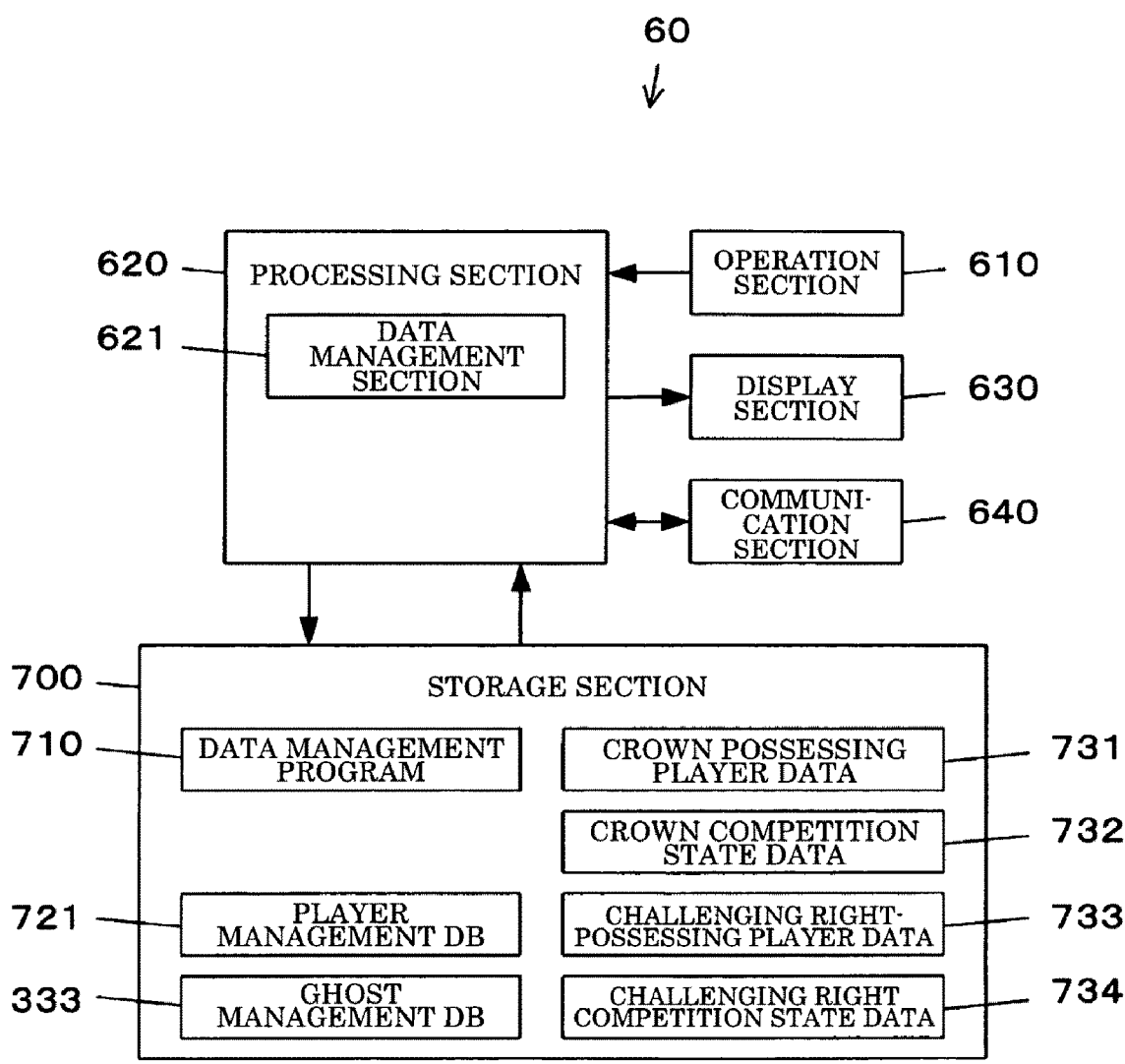
FIG. 36 is a functional configuration diagram of a nationwide server.

FIG. 36 is a block diagram showing the functional configuration of the nationwide server 60. As shown in FIG. 36, the nationwide server 60 is configured to include an operation section 610, a processing section 620, a display section 630, a communication section 640, and a storage section 700.

The operation section 610 receives an operation input from the administrator of the nationwide server 60, and outputs an operation signal corresponding to the operation to the processing section 620. The function of the operation input section 610 is implemented by a button switch, a lever, a dial, a mouse, a keyboard, a touch panel, various sensors, and the like.

The processing section 620 performs various calculations for controlling the entire nationwide server 60 and the like based on a program and data stored in the storage section 700, operation data input from the operation input section 610, data received from an external device (mainly the game device 40) through the communication section 640, and the like. The function of the processing section 620 is implemented by a calculation device such as a processor (e.g., CPU (CISC or RISC) or DSP) or an ASIC (e.g., gate array) and its control program, for example. The processing section 620 includes a data management section 621.

The data management section 621 manages various types of data required for the game device 40 to execute the car racing game. Specifically, when the game device 40 has requested the nationwide server 60 to transmit a list of the players, the data management section 621 extracts the players corresponding to the required match area and satisfying the selected level and racecourse referring to a player management DB 721 and a ghost management DB 333, and transmits a list of the extracted players to the game device 40. Specifically, when the match area is the store, the data management section 621 extracts the players who belong to the required store and satisfy the requested level and whose ghost data 334*d* for the requested racecourse is stored as the corresponding ghost management data 334. When the match area is the whole country, the data management section 621 extracts the players who satisfy the requested level and whose ghost data 334*d* for the requested racecourse is stored as the corresponding ghost management data 334.

Figure 37:
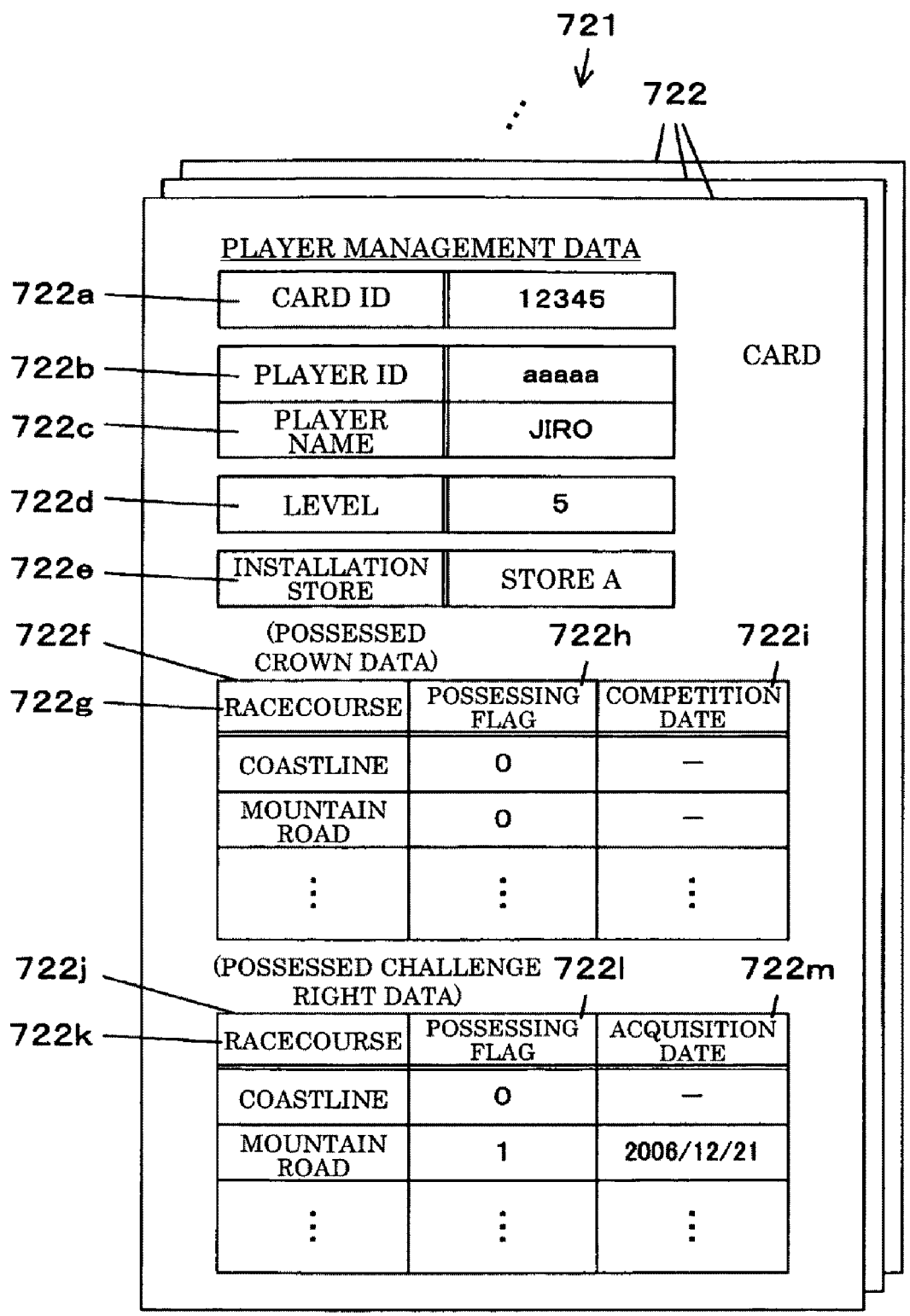
FIG. 37 shows a data configuration example of a player management DB.

FIG. 37 is a view showing an example of the data configuration of the player management DB 721. As shown in FIG. 37, the player management DB 721 includes pieces of player management data 722. The player management data 722 is generated for each player. A card ID 722*a* of the game card 20 possessed by the player, a player ID 722*b* of the player, a player name 722*c*, a level 722*d*, player's store 722*e*, possessed crown data 722*f*, and challenge right data 722*j* are stored as the player management data 722. The possessed crown data 722*f* is data relating to the crown possessed by the player. A possession flag 722*h* and a competition date 722*i* are stored for each racecourse 722*g* while being associated with each other. The possessed challenge right data 722*j* is data relating to the crown challenge right possessed by the player. A possession flag 722*l* and an acquisition date 722*m* are stored for each racecourse 722*k* while being associated with each other. The possession flag 722*l* is a flag indicating whether or not the player possesses the crown challenge right of the corresponding racecourse. The possession flag 722*l* is set at "1" when the player possesses the crown challenge right of the corresponding racecourse. The acquisition date 722*m* is the date when the player acquired the crown challenge right of the corresponding racecourse. The acquisition date 722*m* is stored when the player possesses the crown challenge right of the corresponding racecourse.

When the game device 40 has issued the challenge right competition request, the data management section 621 transmits the challenge right-possessing player data 733 and the challenge right competition state data 734 of the requested store to the game device 40.

FIG. 38 is a view showing an example of the data configuration of the challenge right-possessing player data 733. As shown in FIG. 38, the challenge right-possessing player data 733 is generated in store units. A player 733*c* possessing the challenge right and a date 733*d* when the player acquired the challenge right are stored as the challenge right-possessing player data 733 while being associated with each other together with a store 733*a*.

FIG. 39 is a view showing an example of the data configuration of the challenge right competition state data 734. As shown in FIG. 39, the challenge right competition state data 734 is generated in store units. A match flag 734*c* and a challenge player 734*d* are stored as the challenge right competition state data 734 for each racecourse 734*b* while being associated with each other together with a store 734*a*. The match flag 734*c* is a flag indicating whether or not a challenge right competition is carried out on the corresponding racecourse. The match flag 734*c* is set at "1" when a challenge right competition is carried out on the corresponding racecourse. The challenge player 734*d* indicates a player who is participating in a challenge right competition on the corresponding racecourse.

When the game device 40 has issued a crown competition request, the data management section 621 transmits the crown-possessing player data 731, the crown competition state data 732, and the challenge right data 722*j* of the requested player to the game device 40.

FIG. 40 is a view showing an example of the data configuration of the crown-possessing player data 731. As shown in FIG. 40, a player 731*b* possessing the crown and a date 731*c* when the player acquired the crown are stored as the crown-possessing player data 731 for each racecourse 731*a* while being associated with each other.

FIG. 41 is a view showing an example of the data configuration of the crown competition state data 732. As shown in FIG. 41, a match flag 732*b* and a challenge player 732*c* are stored as the crown competition state data 732 for each racecourse 732*a* while being associated with each other.

When the game device 40 has requested the nationwide server 60 to transmit the ghost data, the data management section 621 refers to the ghost management DB 333 and transmits the ghost data 334*d* of the requested player for the requested racecourse to the game device 40. In this case, when the match mode is the crown competition mode and the challenge mode is the challenge right mode, the requested racecourse of the target store (requested player's store) is set in a challenge right competition state to update the challenge right competition state data 734. When the match mode is the crown competition mode and the challenge mode is the crown challenge mode, the requested racecourse is set in a crown competition state to update the crown competition state data 732.

When the nationwide server 60 has received the match result data 352 from the game device 40, the data management section 621 updates the corresponding data based on the received match result data 352. Specifically, the data management section 621 updates the match racecourse ghost data 334*d* of the ghost management data 334 of the player using the travel history data 352*h* as the play data 334*e*.

When the match mode is the crown competition mode and the challenge mode is the challenge right mode, the data management section 621 cancels the challenge right competition state of the match racecourse of the target store (player's store) to update the challenge right competition state data 734. In this case, when the player has won the match, the data management section 621 transfers the challenge right of the match racecourse of the target store from the opponent player to the player to update the challenge right-possessing player data 733 of the target store and the challenge right data 722*j* of each of the player and the opponent player.

When the match mode is the crown competition mode and the challenge mode is the crown challenge mode, the data management section 621 cancels the crown competition state of the match racecourse to update the crown competition state data 732. In this case, when the player has won the match, the data management section 220 transfers the crown of the match racecourse from the opponent player to the player to update the crown-possessing player data 731 and the possessed crown data 722*f* of each of the player and the opponent player.

In FIG. 36, the display section 630 displays a display screen based on an image signal from the processing section 620 while redrawing the screen of one frame at specific unit time intervals (e.g., every 1/60 second). The function of the display section 630 is implemented by hardware such as a CRT, an LCD, an ELD, a PDP, or an HMD.

The communication section 640 connects with the communication line N2 based on a control signal from the processing section 620, and communicates data with an external device. The function of the communication section 640 is implemented by a wireless communication module, a jack for a communication cable, a control circuit, or the like.

The storage section 700 stores a system program for implementing the function for causing the processing section 620 to integrally control the nationwide server 60, a program and data necessary for implementing various functions, and the like. The storage section 700 is used as a work area for the processing section 620, and temporarily stores the results of calculations performed by the processing section 620 based on various programs, operation data input from the operation input section 610, or the like. The function of the storage section 700 is implemented by an IC memory, a hard disk, a CD-ROM, a DVD, an MO, a RAM, a VRAM, or the like. In this embodiment, the storage section 300 stores a data management program 710 for causing the processing section 620 to function as the data management section 621, and stores the player management DB 721, the ghost management DB 333, the crown-possessing player data 731, the challenge right-possessing player data 733, the crown competition state data 732, and the challenge right competition state data 734.

Process Flow

Figure 42:
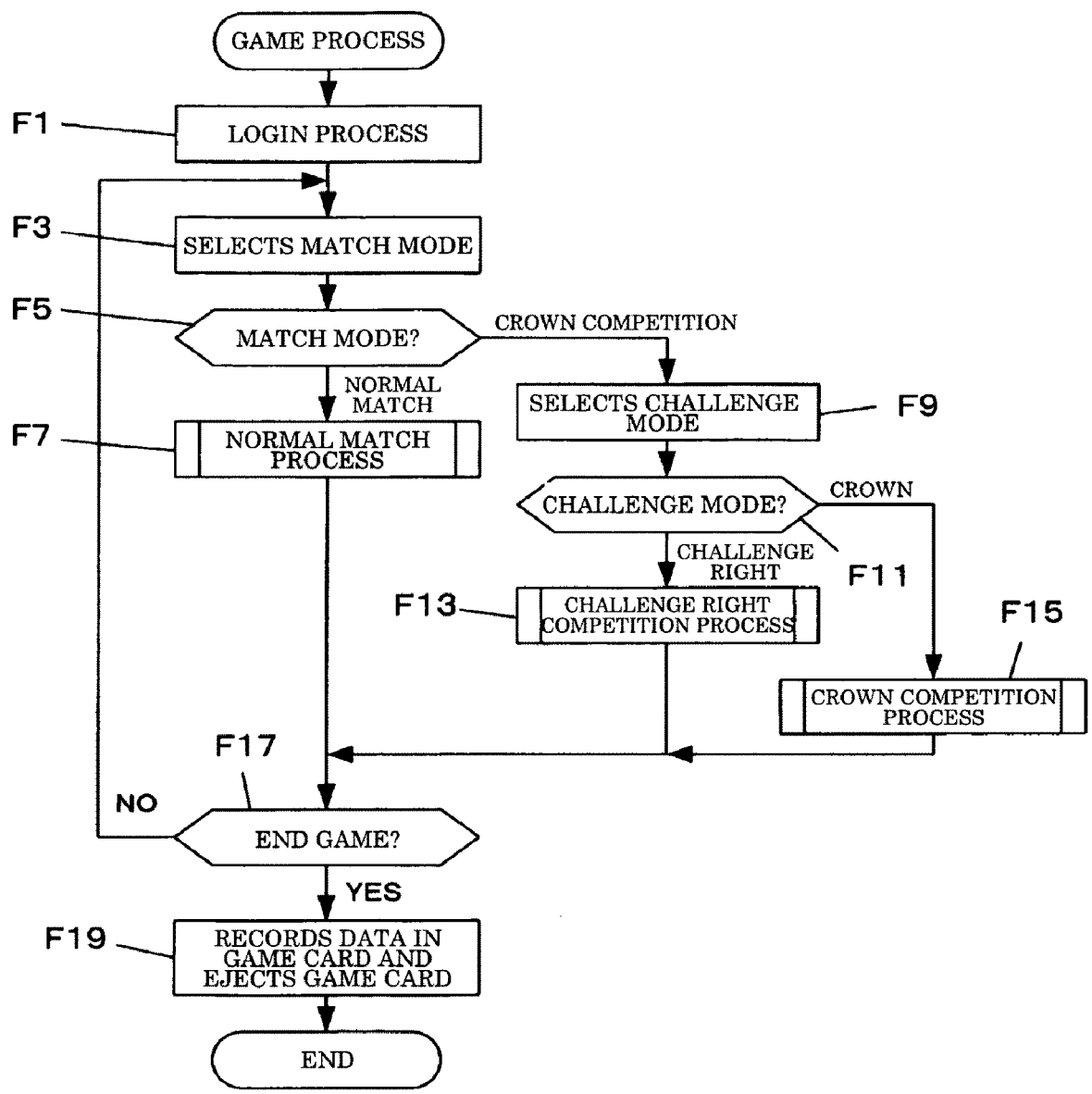
FIG. 42 is a flowchart showing a game process performed by a game device.

FIG. 42 is flowchart illustrative of the flow of the game process of the game device 40. This process is implemented by causing the game calculation section 250 to execute the game program 340. As shown in FIG. 42, the game calculation section 250 performs a specific login process to specify the player. Specifically, the game calculation section 210 specifies the player referring to the player management DB 331 based on the data read from the game card 20 and input from the card read/write section 120 (step F1).

The game calculation section 250 then causes the image display section 130 to display the match mode selection screen (see FIG. 31) for selecting the match mode, and selects the match mode based on the player's selection operation input from the operation input section 110 (step F3). When the selected match mode is the normal match mode (step F5: "normal"), the game calculation section 250 performs a normal match process (step F7).

Figure 43:
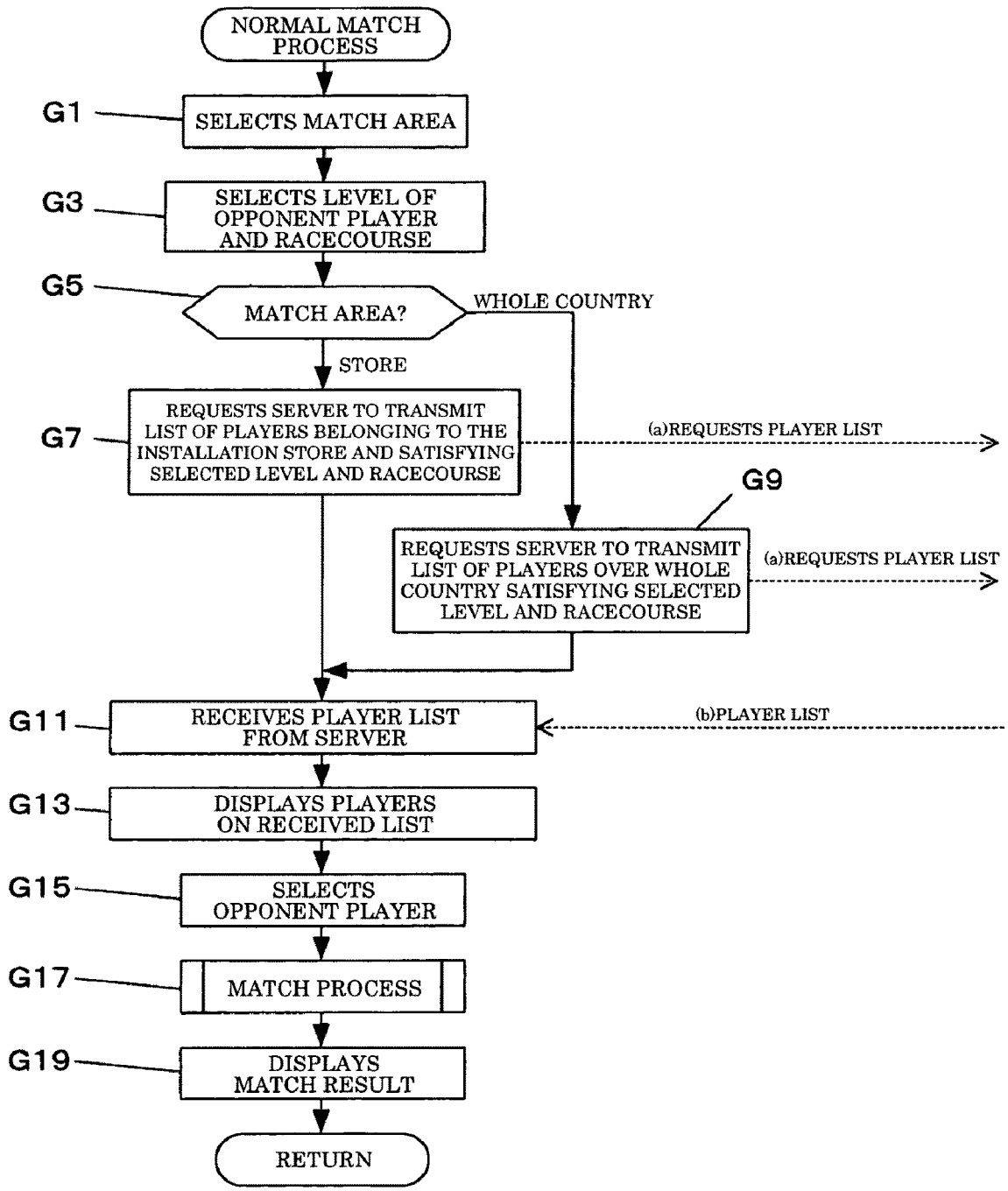
FIG. 43 is a flowchart showing a normal match process performed during the game process.

FIG. 43 is a flowchart illustrative of the flow of the normal match process. A shown in FIG. 43, the game calculation section 250 causes the image display section 130 to display a match area selection screen (not shown) for selecting the match area, and selects the match area based on the selection operation of the player input from the operation input section 110 (step G1). The game calculation section 250 causes the image display section 130 to display a selection screen (not shown) for selecting the level of the opponent player and the racecourse, and selects the level and the racecourse based on the selection operation of the player input from the operation input section 110 (step G3).

When the selected match area is the store (step G5: "store"), the game calculation section 250 requests the nationwide server 60 to transmit a list of the players of the installation store satisfying the selected level and racecourse (step G7). When the selected match area is the whole country (step G5: "whole country"), the game calculation section 250 requests the nationwide server 60 to transmit a list of the players over the whole country satisfying the selected level and racecourse (step G9).

The game calculation section 250 receives the player list transmitted from the nationwide server 60 in response to the request (step G10), and causes the image display section 130 to display the listed players as opponent candidates (step G13). The game calculation section 250 selects one of the players displayed in the list based on the player's selection operation input from the operation input section 110, determines the selected player to be the opponent player, and determines the racecourse selected in advance to be the match racecourse (step G15). The match control section 251 then performs the match process for allowing the player to play a match against the opponent player on the match racecourse (step G17).

Figure 44:
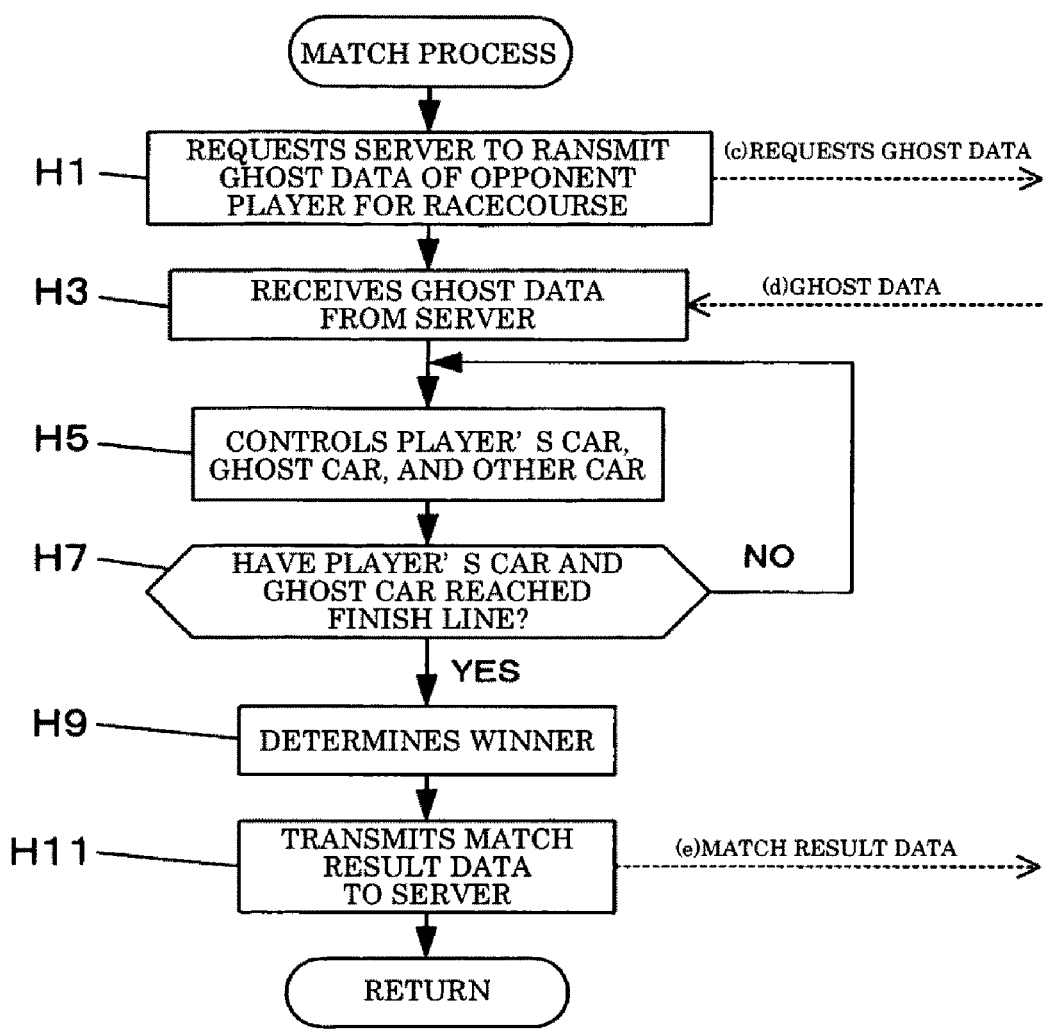
FIG. 44 is a flowchart showing a match process performed during the normal match process.

FIG. 44 is a flowchart illustrative of the flow of the match process. As shown in FIG. 44, the match control section 251 requests the nationwide server 60 to transmit the ghost data 334d of the opponent player for the match racecourse (step H1), and receives the ghost data 334d transmitted from the nationwide server 60 in response to the request (step H3). The match control section 251 controls the player's car PC based on the instruction operation of the player, and controls the ghost car GC and the other car AC using the received ghost data 334d as the match ghost data 334d.

When the player's car PC and the ghost car GC have reached the finish line defined on the racecourse RC (step H7: YES), the match control section 251 determines that the car which has reached the finish line earlier than the other has won the match (step H9). The match control section 251 transmits the match result data 352 relating to the match to the nationwide server 60 (step H11). When the above process has been completed, the match control section 251 finishes the match control.

In FIG. 43, after completion of the match process, the game calculation section 250 causes the image display section 130 to display the match results (e.g., winner and loser) (step G19). When the game calculation section 250 has completed the above process, the game calculation section 250 finishes the normal match process.

In FIG. 42, when the selected match mode is the crown competition mode (step F5: "crown competition"), the game calculation section 250 causes the image display section 130 to display the challenge mode selection screen (see FIG. 32) for selecting the challenge mode, and selects the challenge mode based on the selection operation of the player input from the operation input section 110 (step F9). When the selected match mode is the challenge right mode (step F11: "challenge right"), the game calculation section 250 performs a challenge right competition process (step F13).

Figure 45:
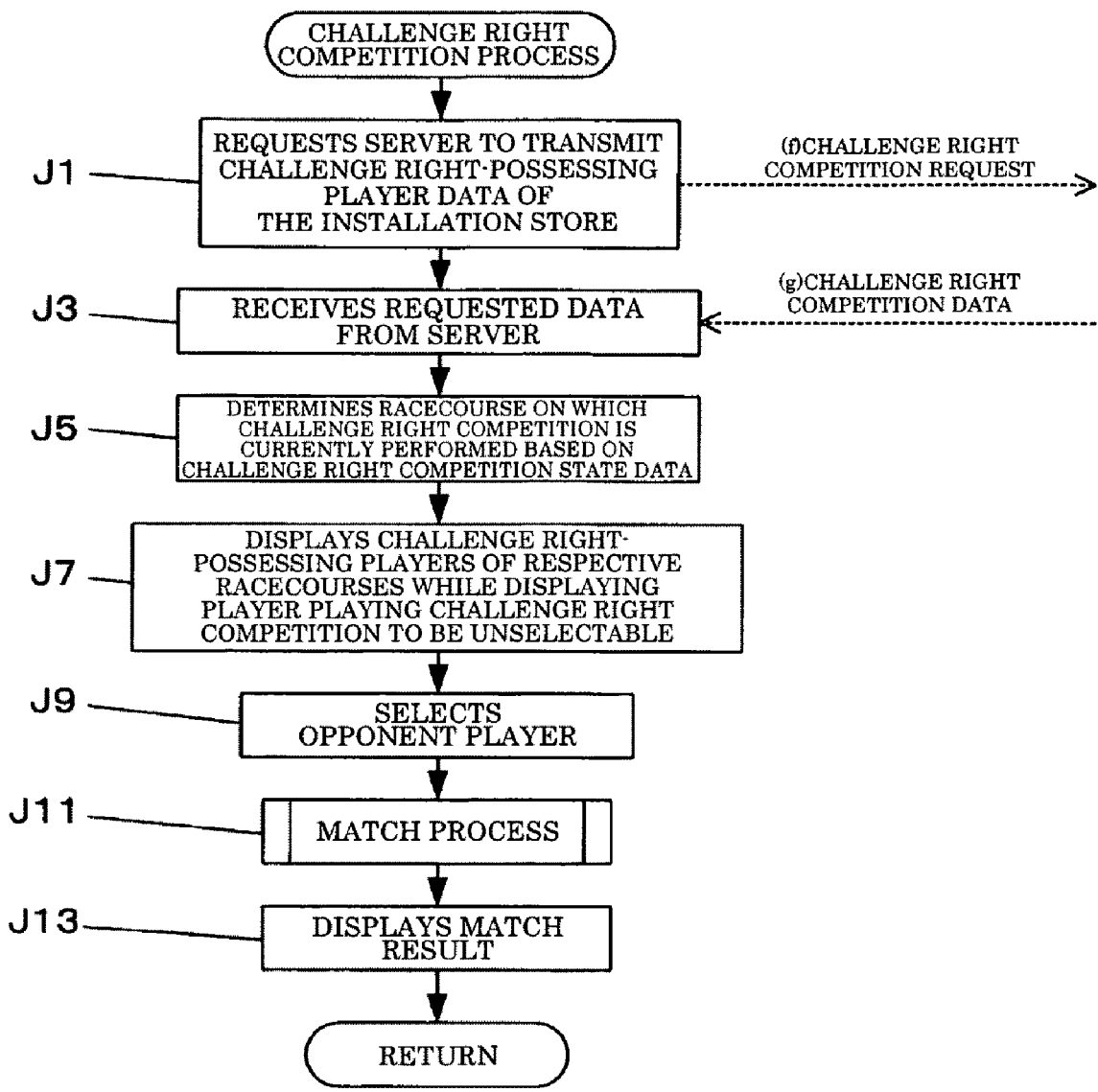
FIG. 45 is a flowchart showing a challenge right competition process performed during the game process.

FIG. 45 is a flowchart illustrative of the flow of the challenge right competition process. As shown in FIG. 45, the game calculation section 250 transmits a challenge right competition request for the challenge right-possessing player data 733 and the challenge right competition state data 734 of the installation store to the nationwide server 60 together with the name of the installation store (step J1), and receives the data (challenge right competition data) transmitted from the nationwide server 60 in response to the request (step J3).

The game calculation section 250 determines the racecourse on which a challenge right competition is currently performed based on the received challenge right competition state data 734 (step J5). The game calculation section 250 then refers to the received challenge right-possessing player data 733 and causes the image display section 130 to display the challenge right player selection screen (see FIG. 33) in which the challenge right-possessing players of the respective racecourses are listed while displaying the player playing a challenge right competition to be unselectable (step J7). The game calculation section 250 selects one of the displayed challenge right-possessing players based on the player's selection operation, determines the selected player to be the opponent player, and determines the racecourse associated with the selected player to be the match racecourse (step J9).

The match control section 251 then performs the match process for allowing the player to play a match against the opponent player on the match racecourse (see FIG. 44) (step J11). After completion of the match process, the game calculation section 250 causes the image display section 130 to display the match results (e.g., winner and loser and whether or not the player has acquired the challenge right) (step J13). When the above process has completed, the game calculation section 250 finishes the challenge right competition process.

In FIG. 42, when the selected match mode is the crown challenge mode (step F11: "crown"), the game calculation section 250 performs a crown competition process (step F15).

Figure 46:
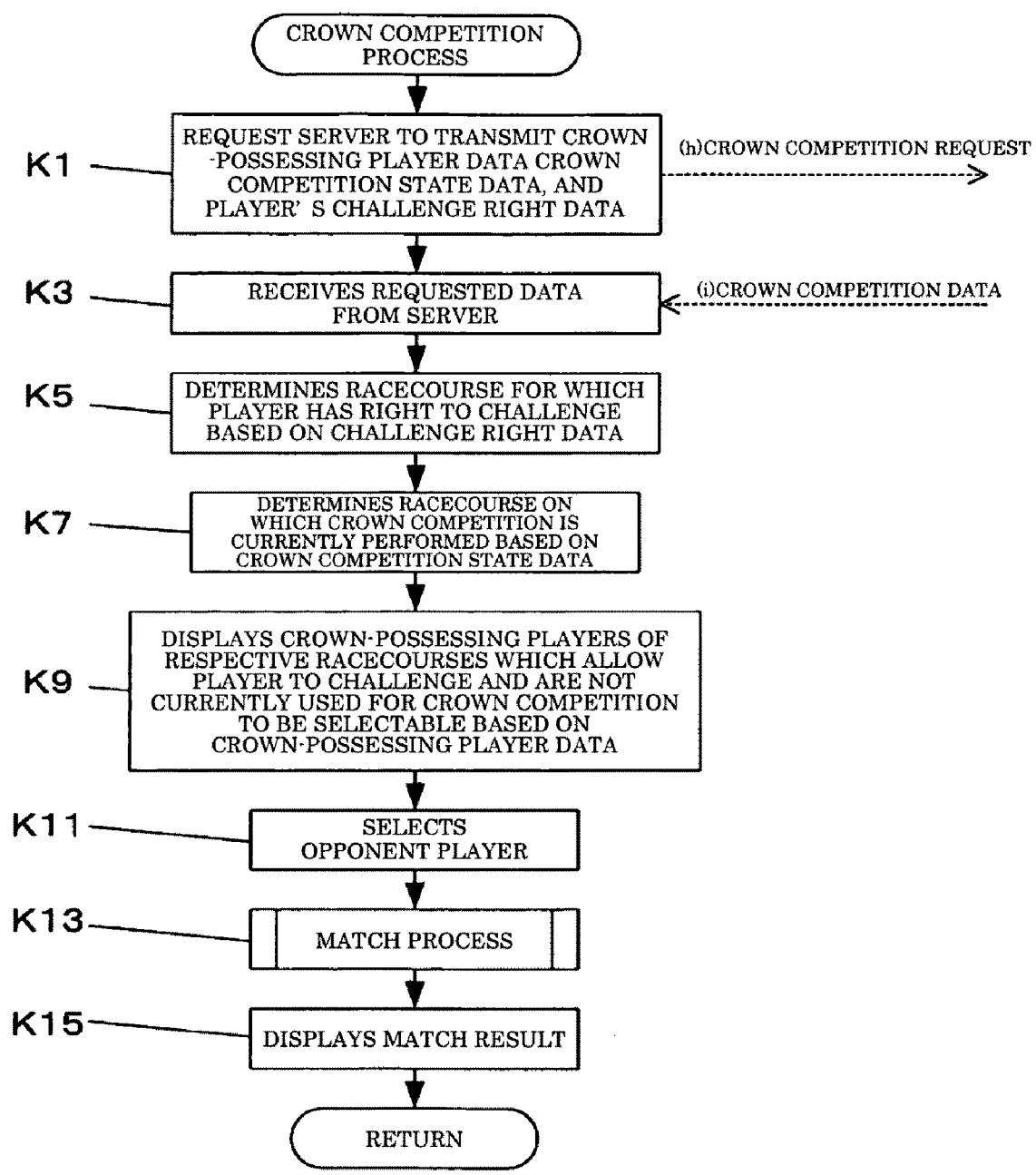
FIG. 46 is a flowchart showing a crown competition process performed during the game process.

FIG. 46 is a flowchart illustrative of the flow of the crown competition process. As shown in FIG. 46, the game calculation section 250 transmits the crown competition request for the crown-possessing player data 731, the crown competition state data 732, and the player's challenge right data 722*j* to the nationwide server 60 together with the name of the player (step K1), and receives the data (crown competition data) transmitted from the nationwide server 60 in response to the request (step K3).

The game calculation section 250 determines the racecourse for which the player possesses the challenge right to be a racecourse for which the player can challenge the crown based on received player's challenge right data 722*j* (step K5). The game calculation section 250 determines the racecourse on which a crown competition is currently performed based on the received crown competition state data 732 (step K7). The game calculation section 250 then refers to the received crown-possessing player data 731 and causes the image display section 130 to display the crown competition player selection screen (see FIG. 34) in which only the players who allow the player to challenge and are not currently playing a crown competition are displayed to be selectable (step K9).

The game calculation section 250 selects one of the displayed crown-possessing players based on the player's selection operation, determines the selected player to be the opponent player, and determines the racecourse associated with the selected player to be the match racecourse (step K11). The match control section 251 then performs the match process for allowing the player to play a match against the opponent player on the match racecourse (see FIG. 44) (step K13). After completion of the match process, the game calculation section 250 then causes the image display section 130 to display the match results (e.g., winner and loser and whether or not the player has acquired the crown) (step K15). When the game calculation section 250 has completed the above process, the game calculation section 250 finishes the crown competition process.

The game calculation section 250 then determines whether or not to finish the game. When the game calculation section 250 has determined to continue the game (step F17: NO), the game calculation section 250 returns to the step F3. When the game calculation section 250 has determined to finish the game (step F17: YES), the game calculation section 250 causes the card read/write section 120 to record data such as the match record in the game card 20 and eject the game card 20 (step F19). When the game calculation section 250 has completed the above process, the game calculation section 250 finishes the game process.

Figure 47:
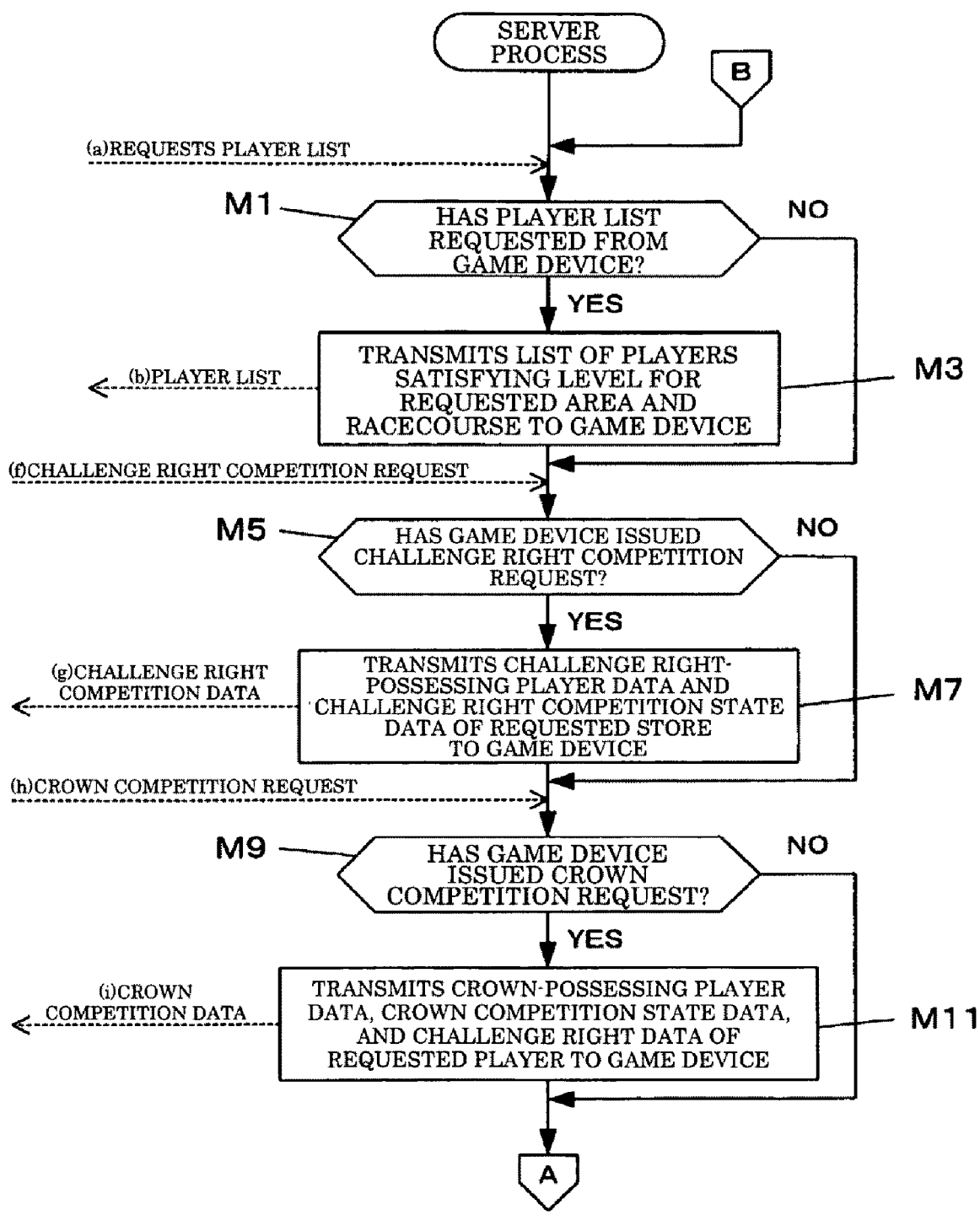
FIG. 47 is a flowchart showing a server process performed by a nationwide server.
Figure 48:
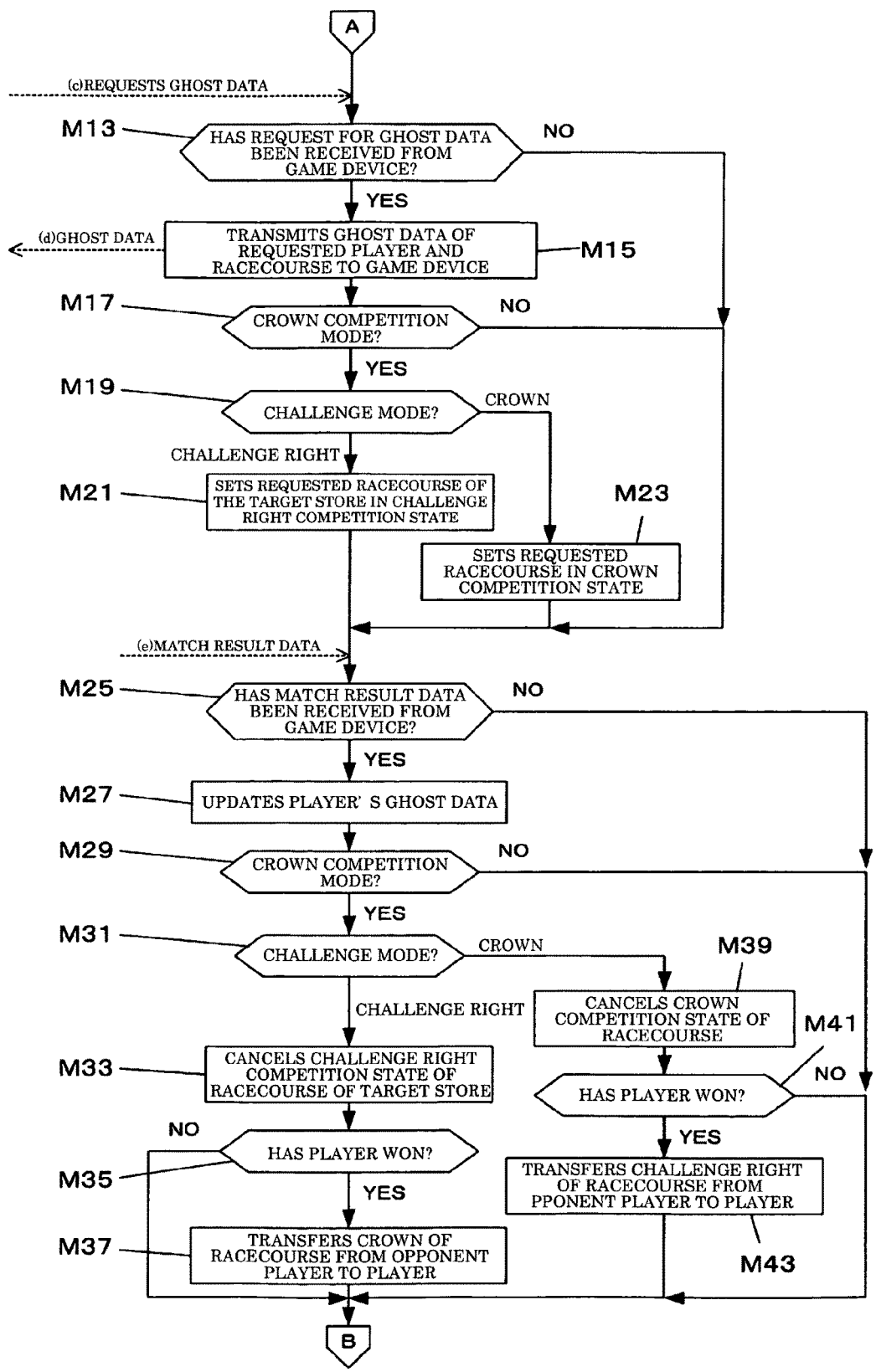
FIG. 48 is a flowchart continued from FIG. 47.

FIG. 47 is flowchart illustrative of the flow of the server process of the nationwide server 60. This process is implemented by causing the data management section 621 to execute the data management program 710. As shown in FIG. 47, when the game device 40 has requested the nationwide server 60 to transmit a list of the players (step M1: YES), the data management section 621 extracts the players satisfying the requested level and racecourse referring to the player management DB 721 and the ghost management DB 333. When the match area is the whole country, the data management section 621 extracts the players who satisfy the requested level and whose ghost data 334*d* for the requested racecourse is stored. When the match area is the store, the data management section 621 extracts the players who belong to the requested store and satisfy the requested level and whose ghost data 334*d* for the requested racecourse is stored. The data management section 621 transmits a list of the extracted players to the game device 40 (step M3).

When the game device 40 has issued a challenge right competition request (step M5: YES), the data management section 621 transmits the challenge right-possessing player data 733 and the challenge right competition state data 734 of the requested store to the game device 40 as the challenge right competition data (step M7).

When the game device 40 has issued a crown competition request (step M9: YES), the data management section 621 transmits the crown-possessing player data 731, the crown competition state data 732, and the challenge right data 722*j* of the requested player to the game device 40 as the crown competition data (step M11).

When the game device 40 has requested the nationwide server 60 to transmit the ghost data (step M13: YES), the data management section 621 refers to the ghost management DB 333 and transmits the ghost data 334*d* of the requested player for the requested racecourse to the game device 40. When the match mode is the crown competition mode (step M17: YES) and the challenge mode is the challenge right mode (step M19: "challenge right"), the data management section 621 sets the requested racecourse of the target store (requested player's store) in a challenge right competition state to update the challenge right competition state data 734 (step M21). When the match mode is the crown competition mode (step: M17: YES) and the challenge mode is the crown challenge mode (step M19: "crown"), the data management section 621 sets the requested racecourse in a crown competition state to update the crown competition state data 732 (step M23).

When the nationwide server 60 has received the match result data 352 from the game device 40 (step M25: YES), the data management section 621 updates the corresponding data based on the received match result data 352. Specifically, the data management section 621 updates the match racecourse ghost data 334*d* of the ghost management data 334 of the player using the travel history data 352*h* as the play data 334*e* (step M27).

When the match mode is the crown competition mode (step M29: YES) and the challenge mode is the challenge right mode (step M31: "challenge right"), the data management section 621 cancels the challenge right competition state of the match racecourse of the target store (player's store) to update the challenge right competition state data 734 (step M33). When the player has won the match (step M35: YES), the data management section 621 transfers the challenge right of the match racecourse of the target store from the opponent player to the player to update the challenge right-possessing player data 733 of the target store and the challenge right data 722*j* of each of the player and the opponent player (step M37).

When the match mode is the crown competition mode (step M29: YES) and the challenge mode is the crown challenge mode (step M31: "crown"), the data management section 621 cancels the crown competition state of the match racecourse to update the crown competition state data 732 (step M39). When the player has won the match (step M41: YES), the data management section 220 transfers the crown of the match racecourse from the opponent player to the player to update the crown-possessing player data 731 and the possessed crown data 722*f* of each of the player and the opponent player (step M43). After completion of the above process, the data management section 621 returns to the step M1.

Modification

The application of the invention is not limited to the above embodiments. Various modifications and variations may be made within the spirit and scope of the invention.

(A) Conditions for Crown Competition and Challenge Right Competition

In the first embodiment, only the player satisfying specific conditions may be allowed to play a crown competition (match against the crown-possessing player). Examples of the specific conditions include conditions relating to the match result and the play history, such as conditions whereby the level is equal to or higher than a specific level (e.g., 5 or higher), conditions whereby the number of victories is equal to or more than a specific number (e.g., 10 or more), or conditions whereby the number of play times is equal to or more than a specific number (e.g., 30 or more). In the second embodiment, only the player satisfying the above specific conditions may be allowed to play a challenge right competition (match against the challenge right-possessing player).

(B) Match Area

In the second embodiment, the challenge right of each racecourse is given in units of stores as the match area. Note that the challenge right of each racecourse may be given in units of floors (e.g., the first floor and the second floor of the store) as the target areas, or the challenge right of each racecourse may be given in units of regions (e.g., administrative divisions) as the target areas, for example.

(C) Speed Control for Ghost Car GC and Another Car AC

In the first and second embodiments, when the match mode is the crown competition mode, the match control section may determine the speed Vg of the ghost car GC based on the following equation (2a), and determine the speed Va of the other car AC based on the following equation (2b).

$$Vg = Vg0 \times Kt \quad (2a)$$

$$Va = Va0 \times Kt \quad (2b)$$

This allows a state to be expressed in which the ghost car GC of the crown-possessing player or the challenge right-possessing player gradually becomes weaker (slower) with the passage of time from the acquisition of the crown or the challenge right. As a result, the crown or the challenge right can be easily acquired from this player.

In this case, when the challenge mode is the crown challenge mode, the elapsed time from the date when the corresponding crown-possessing player acquired the crown may be used as the elapsed time T for determining the elapsed time coefficient Kt instead of the elapsed time from the ghost data update date to the present date. When the challenge mode is the challenge right mode, the elapsed time from the date when the corresponding challenge right-possessing player acquired the challenge right may be used as the elapsed time T for determining the elapsed time coefficient Kt.

(D) Game System

The first embodiment has been described taking a game system configured by connecting the game devices 10 installed in a single store with the communication line N1. Note that another configuration may also be employed. For example, a game system may be configured by connecting the game devices 10 installed in different stores with a communication line such a the Internet, or connecting the game devices 10 as consumer game devices with a communication line such as the Internet.

(E) Server

The above embodiment has been described taking a game system configured by connecting the game devices 10 with the communication line N1. Note that the game system may further include a server device. Specifically, the server device collects play data of the player of each game device and manages the play data as the ghost data of the player. Specifically, the server device receives a request from the game device, and transmits the requested ghost data to the game device. The game device executes the ghost match controlling the ghost car based on the ghost data received from the server device. When the match has completed, the game device transmits the match result data including the play data of the player (travel history data of the player's car) and the match result to the server device. The server device determines whether or not the player has acquired the crown based on the match result data received from the game device, and updates the corresponding data.

(F) Applicable Game Device

The above embodiment illustrates the case of applying the invention to an arcade game device. Note that the invention may also be applied to other game devices such as a consumer game device or a portable game device. Alternatively, the invention may be applied to devices having a communication function such as a portable electronic instrument (e.g., PDA and portable telephone) or a personal computer.

(G) Applicable Game

The above embodiment illustrates the case of applying the invention to a car racing game. Note that the invention may also be applied to other games in which a player plays a match against a character of another player. For example, when applying the invention to a fighting action game, player's play tendency data may be stored as the play data. Specifically, the number of operations (or operation frequency) of actions (commands) such as a punch and a kick input by the player during game plays is summed up for each player. A ghost character is stochastically controlled based on the play tendency data. Alternatively, player's operation data (e.g., button operation record) may be stored as the play data in time series.

Although only some embodiments of the invention have been described above in detail, those skilled in the art would readily appreciate that many modifications are possible in the embodiments without materially departing from the novel teachings and advantages of the invention. Accordingly, such modifications are intended to be included within the scope of the invention.

What is claimed is:

1. A game device comprising:
   a play data storage section that stores play data of each player recorded in a form available as control data of a computer-controlled character (hereinafter called "COM character") and identification information of the player while associating the play data with the identification information;
   a champion management section that manages one of the players as a champion, and manages a day when the one of the players became the champion;
   a login section that performs a specific login process to specify a present player;
   a match process section that performs a match process by controlling the COM character based on the play data stored in the play data storage section and belonging to the player managed as the champion by the champion management section and controlling a player's character based on an operation input of the present player; and
   a play data update section that updates the play data of the player stored in the play data storage section based on the play data of the player during the match process of the match process section,
   the play data including data relating to a moving speed and a travel path during actual play;

the match process section controls the COM character during actual play along the travel path included in the play data about the player managed as the champion by the champion management section, monitors during actual play a collision condition between the player character and the COM character, deviates during actual play the COM character from the travel path when a collision is detected, and controls during actual play the COM character so as to gradually return to the travel path following the deviation during actual play; and the champion management section allowing the champion to remain unchanged when the present player has lost the match as a result of the match process of the match process section, and managing the present player as a new champion when the present player has won the match as a result of the match process of the match process section.

2. The game device as defined in claim 1, wherein, when the player managed as the champion by the champion management section has been specified as the present player by the login process and has defeated a COM character controlled based on the play data of the player as a result of the match process, the play data update section updates the play data of the player stored in the play data storage section based on the play data when the player defeated the COM character, and the champion management section updates the day when the player became the champion with the day when the player defeated the COM character.

3. The game device as defined in claim 1,
wherein the play data storage section stores the play data in units of game-playable game stages;
wherein the champion management section manages the champions in units of the game stages;
wherein the game device further comprises an opponent champion selection section that selects an opponent champion from the champions in units of the game stages managed by the champion management section; and
wherein the match process section performs the match process in a game stage corresponding to the champion selected by the opponent champion selection section by controlling the COM character based on the play data of the champion in the game stage.

4. The game device as defined in claim 1, further comprising:
a player information management section that manages player information including at least a play level and/or a play match record of each of the players; and
a match permission determination section that determines whether or not to allow a match between the present player specified by the login process and the champion based on the player information of the present player;
wherein the match process section does not perform the match process when the match permission determination section has determined not to allow the match, and performs the match process when the match permission determination section has determined to allow the match.

5. The game device as defined in claim 1, further comprising:
a data update section that communicates with another game device and updates the information stored in the play data storage sections of the game devices and the information managed by the champion management sections of the game devices with identical and latest information.

6. The game device as defined in claim 1,
wherein the match process section controls the speed of the COM character and the speed of the player's character so that the player's character more easily reaches the COM character as the distance between the COM character and the player's character increases, and more easily reaches the COM character as the number of days increases, when the COM character precedes the player's character.

7. The game device as defined in claim 1,
wherein the match process section controls a speed of the COM character and a speed of the player's character using the data relating to the moving speed included in the play data about the player managed as the champion, the operation input of the present player, a distance between the COM character and the player's character, and the number of days elapsed from the day when the one of the players became the champion.

8. A game system comprising:
a game device; and
a server device capable of communicating with a game device that performs a match process by controlling a COM character and controlling a player's character based on an operation input of a player, the server device comprising:
a play data storage section that stores play data of each player recorded in a form available as control data of the COM character and identification information of the player while associating the play data with the identification information;
a champion management section that manages one of the players as a champion, and manages a day when the one of the players became the champion;
a champion play data transmission section that transmits the play data stored in the play data storage section and belonging to the player managed as the champion by the champion management section to the game device for use as control data of the COM character in the match process;
a champion day transmission section that transmits the day managed by the champion management section to the game device; and
a play data update section that receives the play data of the player during the match process from the game device, and updates the play data of the player stored in the play data storage section based on the received play data,
the champion management section allowing the champion to remain unchanged when the player has lost the match as a result of the match process of the game device, and managing the player as a new champion when the player has won the match as a result of the match process of the game device, and
the play data including data relating to a moving speed and a travel path during actual play; and
the game device comprising:
a match process section that performs the match process by controlling the COM character based on the play data about the player managed as the champion by the champion management section that has been received from the server device, and controlling the player's character based on an operation input of the present player,
the match process section controls the COM character during actual play along the travel path included in the play data about the player managed as the champion by the champion management section, monitors during actual play a collision condition between the player character and the COM character, deviates during actual play the COM character from the travel path when a collision is detected, and controls during actual play the COM character so as to gradually return to the travel path following the deviation.

9. The game system as defined in claim 8,
wherein the play data storage section stores the play data in units of game-playable game stages in the game device;
wherein the champion management section manages the champions in units of the game stages;
wherein the server device further comprises a champion select signal reception section that receives from the game device a select signal that selects an opponent champion from the champions in units of the game stages managed by the champion management section; and
wherein the champion play data transmission section transmits to the game device the play data of the champion selected based on the received select signal in the game stage managed by the champion management section as the champion.

10. The game system as defined in claim 8, the server device further comprising:
a challenger management section that manages a player allowed to play a match against the champion as a challenge right-possessing player;
a challenge permission determination section that performs a specific communication with the game device and determines whether or not the present player of the game device is managed as the challenge right-possessing player by the challenger management section; and
a challenge right-possessing player play data transmission section that transmits the play data of the player managed as the challenge right-possessing player by the challenger management section to the game device when the challenge permission determination section has determined that the present player of the game device is not managed as the challenge right-possessing player by the challenger management section;
wherein the champion play data transmission section does not transmit the play data of the player managed as the champion when the challenge permission determination section has determined that the present player of the game device is not managed as the challenge right-possessing player by the challenger management section; and
wherein the challenger management section allows the challenge right-possessing player to remain unchanged when the present player of the game device has lost the match as a result of the match process, and manages the player as a new challenge right-possessing player when the player has won the match as a result of the match process.

11. The game system as defined in claim 8, the game device further comprising:
a login section that performs a specific login process to specify a present player;
a match process section that performs a match process by controlling the COM character based on the play data of the player managed as the champion by the server device transmitted from the server device and controlling a player's character based on an operation input of the present player; and
a match process play data transmission section that transmits the play data of the player during the match process of the match process section to the server device.

12. The game system as defined in claim 8,
wherein the match process section controls the speed of the COM character and the speed of the player's character so that the player's character more easily reaches the COM character as the distance between the COM character and the player's character increases, and more easily reaches the COM character as the number of days increases, when the COM character precedes the player's character.

13. The game system as defined in claim 8,
wherein the match process section controls a speed of the COM character and a speed of the player's character using the data relating to the moving speed included in the play data about the player managed as the champion, the operation input of the present player, a distance between the COM character and the player's character, and the number of days elapsed from the day when the one of the players became the champion.

14. A game process control method comprising causing a computer to:
store play data of each player recorded in a form available as control data of a COM character and identification information of the player while associating the play data with the identification information;
manage one of the players as a champion;
perform a specific login process to specify a present player;
manage a day when the one of the players became the champion;
perform a match process by controlling the COM character based on the play data stored in the play data storage section and belonging to the player managed as the champion by the champion management section and controlling a player's character based on an operation input of the present player;
update the play data of the player stored in the play data storage section based on the play data of the player during the match process of the match process section; and
allow the champion to remain unchanged when the present player has lost the match as a result of the match process, and manage the present player as a new champion when the present player has won the match as a result of the match process,
the play data including data relating to a moving speed and a travel path during actual play; and
the match process including controlling the COM character during actual play along the travel path included in the play data about the player managed as the champion by the champion management section, monitoring during actual play a collision condition between the player character and the COM character, deviating during actual play the COM character from the travel path when a collision is detected, and controlling during actual play the COM character so as to gradually return to the travel path following the deviation.

15. The game process control method as defined in claim 14,
wherein the match process includes controlling the speed of the COM character and the speed of the player's character so that the player's character more easily reaches the COM character as the distance between the COM character and the player's character increases, and more easily reaches the COM character as the number of days increases, when the COM character precedes the player's character.

16. The game process control method as defined in claim 14, wherein the match process includes controlling a speed of the COM character and a speed of the player's character using the data relating to the moving speed included in the play data about the player managed as the champion, the operation input of the present player, a distance between the COM character and the player's character, and the number of days elapsed from the day when the one of the players became the champion.

* * * * *